US012686342B2

(12) United States Patent
Stahl et al.

(10) Patent No.: US 12,686,342 B2
(45) Date of Patent: Jul. 21, 2026

(54) PIVOTABLE BICYCLE RACK

(71) Applicant: BELL SPORTS, INC., Irvine, CA (US)

(72) Inventors: Stefan Stahl, Carbondale, CO (US); Tommy Knight, Brighton, CO (US)

(73) Assignee: Bell Sports, Inc., Irvine, CA (US)

( * ) Notice: Subject to any disclaimer, the term of this patent is extended or adjusted under 35 U.S.C. 154(b) by 132 days.

(21) Appl. No.: 18/459,735

(22) Filed: Sep. 1, 2023

(65) Prior Publication Data

US 2024/0075885 A1 Mar. 7, 2024

Related U.S. Application Data

(60) Provisional application No. 63/403,207, filed on Sep. 1, 2022, provisional application No. 63/530,452, filed on Aug. 2, 2023.

(51) Int. Cl.
B60R 9/10 (2006.01)
B60R 9/06 (2006.01)

(52) U.S. Cl.
CPC . B60R 9/10 (2013.01); B60R 9/06 (2013.01)

(58) Field of Classification Search
CPC .................................. B60R 9/06; B60R 9/10
USPC ......................................................... 224/400
See application file for complete search history.

(56) References Cited

U.S. PATENT DOCUMENTS 3,348,713 A * 10/1967 Will .......................... B60R 9/10
                                                          414/462
4,189,274 A 2/1980 Shaffer 4,234,284 A * 11/1980 Hauff ......................... B60R 9/06
                                                          224/521
4,400,129 A * 8/1983 Eisenberg ................. B60R 9/06
                                                          224/532
4,875,608 A * 10/1989 Graber ...................... B60R 9/10
                                                          224/532
4,934,894 A * 6/1990 White .................. A61G 3/0209
                                                          414/537
5,462,398 A 10/1995 Hymer
5,527,146 A * 6/1996 Allsop ...................... B60R 9/12
                                                          414/462

(Continued)

OTHER PUBLICATIONS

Examination Report for related Canadian Application No. 3210639, dated Jan. 29, 2025; 7 pgs.

(Continued)

*Primary Examiner* — Peter N Helvey
(74) *Attorney, Agent, or Firm* — Reed Smith LLP; Walter M. Egbert, III; Richard J. Brown

(57) ABSTRACT

A bike carrier that retains the wheels of a bike in a tray between pivoting retention arms with ratchets that hold the arms against the tires. In embodiments, a retention arm pivot lock acts on a stay between each wheel retention arm and the tray to which it is attached, wherein the pivot ratchet is configured to allow the wheel retention arm to pivot through a reflex angle to provide inward pivoting of the wheel retention arm and outward pivoting of the wheel retention arm to provide a frame for a ramp to allow the bike to roll onto first and second wheel trays. In embodiments, the carrier comprises a rotational pivot assembly configured to pivot the bike carrying tray assembly among a horizontal position, a first downward position and a second downward position.

16 Claims, 32 Drawing Sheets

(56)                References Cited

U.S. PATENT DOCUMENTS

| | | | | |
|---|---|---|---|---|
| 5,690,260 | A * | 11/1997 | Aikins | B60R 9/10 |
| | | | | 224/532 |
| 6,139,247 | A * | 10/2000 | Wright | B60R 9/06 |
| | | | | 414/470 |
| 6,345,749 | B1 * | 2/2002 | Hamilton | B60R 9/06 |
| | | | | 224/524 |
| 6,485,243 | B1 * | 11/2002 | Ferman | B60R 9/06 |
| | | | | 224/520 |
| 6,685,421 | B1 * | 2/2004 | Reeves | B60P 1/4407 |
| | | | | 414/540 |
| 10,668,866 | B2 * | 6/2020 | Kuschmeader | B60R 9/10 |
| 11,046,379 | B2 * | 6/2021 | Tsai | B62H 3/00 |
| 11,208,167 | B2 | 12/2021 | Kuschmeader et al. | |
| 11,351,929 | B2 * | 6/2022 | McFadden | B60R 9/10 |
| 11,383,652 | B1 | 7/2022 | Huang | |
| 11,643,001 | B1 * | 5/2023 | Thompson | B62K 7/04 |
| | | | | 414/462 |
| 12,024,132 | B1 * | 7/2024 | Oshman | B60R 9/06 |
| 12,049,198 | B2 * | 7/2024 | Settelmayer | B60R 9/048 |
| 2002/0117526 | A1 * | 8/2002 | Anderson | B60R 9/10 |
| | | | | 224/532 |
| 2002/0154980 | A1 * | 10/2002 | Potts | B60R 9/06 |
| | | | | 414/470 |
| 2008/0099522 | A1 | 5/2008 | Clausen et al. | |
| 2009/0020577 | A1 * | 1/2009 | Johnson | B60R 9/06 |
| | | | | 224/519 |
| 2013/0062385 | A1 * | 3/2013 | Pedrini | B60R 9/10 |
| | | | | 224/501 |
| 2014/0299642 | A1 * | 10/2014 | Schatz | B60R 9/10 |
| | | | | 224/496 |
| 2015/0217703 | A1 | 8/2015 | Deming et al. | |
| 2018/0050645 | A1 | 2/2018 | Phillips | |
| 2018/0354427 | A1 * | 12/2018 | Yazdian | B60R 9/10 |
| 2020/0156724 | A1 * | 5/2020 | Kuschmeader | B60R 9/06 |
| 2021/0009223 | A1 * | 1/2021 | Tsai | B62H 3/00 |
| 2022/0219614 | A1 * | 7/2022 | Prescott | B60R 9/06 |
| 2024/0051472 | A1 * | 2/2024 | Obermark | B60R 9/06 |
| 2024/0051473 | A1 * | 2/2024 | Obermark | B60R 9/10 |

OTHER PUBLICATIONS

Second Examination Report for related Australian Application No. 2023219836, dated Jan. 17, 2025; 5 pgs.

First Examination Report in related Australian Application No. 2023219836, dated Sep. 9, 2024; 5 pgs.

* cited by examiner 161   216   208   191   193   194   200   214

206          207

B 115a          161          115b

PIVOTABLE BICYCLE RACK

RELATED APPLICATIONS

This application claims priority to U.S. Provisional Patent Application No. 63/403,207, which is entitled "PIVOTABLE BICYCLE RACK", filed on Sep. 1, 2022, the disclosure of which is hereby incorporated by reference. This application claims priority to U.S. Provisional Patent Application No. 63/530,452, which is entitled "PIVOTABLE BICYCLE RACK", filed on Aug. 2, 2023, the disclosure of which is hereby incorporated by reference.

FIELD OF TECHNOLOGY

This relates to racks for holding bicycles, including display, storage, or parking racks, and especially bicycle carriers on motor vehicles.

BACKGROUND

Existing racks for carrying bicycles on motor vehicles use hangers, clamps, elastic straps, or quick-release cams to hold the bicycle in the rack. These devices require multiple operations to secure or release the bicycle. Hangers and clamps can mar the finish of a bicycle frame due to the jolting and vibration of a traveling vehicle. Straps are subject to loosening, tearing, and deterioration.

Bicycle wheels should not be free to spin in the slipstream of a motor vehicle, and the steering wheel of the bicycle should not be free to turn. Otherwise, damage to the bicycle and/or the motor vehicle can result. Many racks do not inherently secure the wheels, relying on the competence and discretion of the user to do so with straps.

Existing bicycle racks require a user to lift the bicycle onto the rack to load it. Particularly for heavier bikes, such as beach bikes, off-road bikes and electric powered bikes, that may be difficult. It is desirable to develop carriers that enable a bike to roll onto the carrier from the ground.

SUMMARY OF DESCRIBED SUBJECT MATTER

The disclosed bicycle rack achieves these objectives. It holds bicycles by their tires only, protects the bicycle frame from scratches, and prevents the wheels from spinning or turning. The rack or portions thereof pivot from a horizontal configuration to reach to ground level, providing a ramp for the bike to roll onto an elongated track including first and second wheel trays with central channels to accommodate the bottoms of the bike wheels. A pivoting wheel retention arm attached to each end of the track pivots inward, against and around each tire, bracketing the bicycle in all directions.

Each bike tire is held by one of the arms described herein. At least one of the two arms pivots at its base to allow insertion and removal of the bike. The pivoting arm is controlled by a tightening mechanism that pulls the arm inward against the tire. Preferably, both arms pivot fully inward to lie against the track when the rack is not in use.

The pivotal position of each wheel retention arm is controlled by a retention arm pivot lock, such as a linear ratchet with ratchet teeth or a clamping mechanism. In embodiments, the wheel retention arms are configured to pivot through a reflex angle from a horizontal closed position over the wheel trays through an intermediate wheel engagement position to a below-horizontal position that provides a frame to support a ramp insert that allows a bike to roll onto the wheel trays. Preferably, the wheel retention arms include two parallel side arms and a cross member, which, in combination, form an H-shape or inverted U-shape depending on the position of the cross member, which can be adjusted for different sized bike tires.

A trailer hitch receiver version of the bike carrier includes a main tray assembly with first and second aligned bicycle wheel trays to receive the front and back wheels of a bike. The main tray assembly is pivotally attached to a trailer hitch drawbar, allowing the assembly to pivot upward into a compact position behind a motor vehicle. A trigger on the back end of the main tray assembly controls the pivot of the assembly so the user does not need to stoop or kneel to reach a pivot lock bar. The two wheel trays pivot into a parallel position over the drawbar for compact shipping and storage without disassembly. In embodiments, the trays lock in the deployed position by respective levers.

In embodiments, the drawbar assembly also includes a rotational pivot assembly coupled to the drawbar and the bike carrying tray assembly configured to pivot the bike carrying tray assembly among a horizontal position, a first downward position and a second downward position. The first downward position lowers an end of the first wheel tray toward the ground and the second downward position lowers an end of the second wheel tray toward the ground. Either the first position or the second position allows a bike to be rolled onto the carrier and secured using the wheel retention arms. Pivoting the bike carrying tray assembly back to the horizontal position allows for transporting the bike.

An add-on tray assembly can be attached, e.g., bolted, to the main tray assembly to carry a second bike or up to three bikes using two add-on assemblies. Notably, if e-bikes are carried, a single add-on assembly may be recommended, so two e-bikes may be carried. If lighter weight bicycles are carried, a second add-on assembly may allow three bicycles to be carried.

Provided is a bike carrier including a bike carrying tray assembly including first and second bike wheel trays for holding respective first and second wheels of a bike; a wheel retention arm pivotally attached to a distal end of each of the trays, and a retention arm pivot ratchet acting on a stay between each wheel retention arm and the tray to which it is attached, wherein the pivot ratchet is configured to allow the wheel retention arm to pivot through a reflex angle to provide inward pivoting of the wheel retention arm to lock the retention arm against the tire of the respective wheel, provide outward pivoting of the wheel retention arm to release the bike from the carrier, and provide further outward pivoting to provide a frame for a ramp to allow the bike to roll onto the first and second bike wheel trays.

Embodiments of the bike carrier include the following, alone or in any combination.

Each wheel retention arm includes two parallel side arms and a cross member between them that contacts a tire of the respective wheel of the bike, wherein the cross member of each wheel retention arm is mounted between the parallel side arms at a selectable position along a length of the parallel side arms that allows the cross member to adjust for different diameters of bike wheels. In embodiments the parallel side arms and the cross member define an H-shaped or an inverted U-shaped retention arm.

The cross member of each wheel retention arm is mounted between the parallel side arms in respective opposed slots or opposed holes of a plurality of holes by a releasable mechanism.

The ramp includes an additional wheel tray disposed between the parallel side arms of a wheel retention arm at a selectable position along a length of the parallel side arms.

The ramp is mountable between the parallel side arms of each wheel retention arm in respective opposed slots or opposed holes of a plurality of holes by a releasable mechanism.

The first and second bike wheel trays are each pivotally mounted to the bike carrying tray assembly for pivoting of said trays between a co-aligned laterally extending operational position and a forward position for compact shipping and storage.

A back end of the bike carrying tray assembly is configured to engage an add-on bike carrying tray assembly.

The back end of the bike carrying tray assembly includes holes to bolt the add-on bike carrying tray assembly to the main bike carrying tray assembly. Alternatively, the add-on assembly can be attached to the main assembly using a quick release lever or a spring loaded pin.

The bike carrier may be configured for mounting to a tubular trailer hitch receiver on a motor vehicle, including a drawbar assembly attached to the bike carrying tray assembly, the drawbar assembly including a drawbar for the tubular trailer hitch receiver.

The drawbar assembly may further include a horizontal crossbar attached to a back end of the drawbar; left and right vertically oriented pivot plates attached to respective left and right ends of the crossbar, each pivot plate including a plurality of pivot lock slots providing a plurality of pairs of opposed pivot lock slots on the pivot plates; wherein the bike carrying tray assembly is pivotally mounted onto the pivot plates; a pivot lock bar on the bike carrying tray assembly that slides into a selected pair of the pivot lock slots under a spring force; and a trigger operationally connected to the pivot lock bar at a back end of the bike carrying ray assembly; wherein operating the trigger slides the pivot lock bar out of a selected pair of pivot lock slots, enabling the carrying rack to be pivoted upward into a compact position behind the motor vehicle, and downward into a deployed position for carrying a bike, wherein the compact and deployed positions are each lockable by the pivot lock bar disposed in a respective pair of the pivot lock slots.

The trigger may be operationally connected to the pivot lock bar via a trigger cable slidably mounted in the bike carrying tray assembly and attached to the pivot lock bar. In embodiments, the trigger cable is long enough to reach through the add-on assembly to allow a user to pivot the carrying tray when an add-on assembly is used. Alternatively, the trigger is operationally connected to the pivot lock bar via a linkage assembly. Alternatively, the add-on bike carrying tray assembly includes a trigger cable extension to engage the trigger (or trigger cable) of the bike carrying tray assembly.

A back end of the bike carrying tray assembly is configured to engage an add-on bike carrying tray assembly.

The back end of the bike carrying tray assembly includes holes to bolt the add-on bike carrying tray assembly to the bike carrying tray assembly.

The drawbar assembly further includes a rotational pivot assembly coupled to the drawbar and the bike carrying tray assembly configured to pivot the bike carrying tray assembly among a horizontal position, a first downward position and a second downward position.

The rotational pivot assembly includes a pivot ring including a positioning hole, a first bevel and a second bevel; and a spring loaded adjustment pin configured to engage the positioning hole to dispose the bike carrying tray assembly in a horizontal position, wherein pulling the spring loaded adjustment pin from the positioning hole allows the spring loaded adjustment pin to engage the first bevel and tilt the first bike wheel tray downward into the first downward position, or engage the second bevel and tilt the second bike wheel tray downward into the second downward position.

Also provided is a bike carrier configured for mounting to a tubular trailer hitch receiver on a motor vehicle including a bike carrying tray assembly including first and second wheel trays for holding respective first and second wheels of a bike; a wheel retention arm pivotally attached to a distal end of each of the trays them that contacts a tire of the respective wheel of the bike; and a retention arm pivot ratchet acting on a stay between each wheel retention arm and the tray to which it is attached, wherein the pivot ratchet is configured to allow the wheel retention arm to pivot to provide inward pivoting of the wheel retention arm to lock the retention arm pressed against the tire of the respective wheel and provide outward pivoting of the wheel retention arm to release the bike from the carrier; and a drawbar assembly attached to the bike carrying tray assembly, the drawbar assembly including a drawbar for the tubular trailer hitch receiver; and a rotational pivot assembly coupled to the drawbar and the bike carrying tray assembly configured to pivot the bike carrying tray assembly among a horizontal position, a first downward position and a second downward position.

Embodiments of the bike carrier include the following, alone or in any combination.

In some embodiments, the rotational pivot assembly includes a pivot ring including a positioning hole, a first bevel and a second bevel; and a spring loaded adjustment pin configured to engage the positioning hole to dispose the bike carrying tray assembly in a horizontal position, wherein pulling the spring loaded adjustment pin from the positioning hole allows the spring loaded adjustment pin to engage the first bevel and tilt the first bike wheel tray downward into the first downward position, or engage the second bevel and tilt the second bike wheel tray downward into the second downward position.

In some embodiments, the rotational pivot assembly includes a vertically oriented pivot plate attached to a bike carrying tray assembly, the pivot plate including a positioning hole defining a first keyhole recess; the drawbar assembly further including a pivot ring rotatable in the positioning hole, the pivot ring further defining a second keyhole recess alignable with the first keyhole recess; and a retention pin assembly including a handle rotatably coupled to the vertically oriented pivot plate; and a spring loaded retention pin movable by the handle and including an engagement member configured to move between a first position in which the engagement member is disposed in the first and second keyhole recess to inhibit rotation of the pivot ring with respect to the pivot plate and a second position in which the engagement member is disposed within the first keyhole recess to permit rotation of the pivot ring with respect to the pivot plate.

The drawbar assembly further includes a horizontal crossbar attached to a back end of the drawbar; left and right vertically oriented pivot plates attached to respective left and right ends of the crossbar, each pivot plate including a plurality of pivot lock slots providing a plurality of pairs of opposed pivot lock slots on the pivot plates; wherein the bike carrying tray assembly is pivotally mounted onto the pivot plates; a pivot lock bar on the bike carrying tray assembly that slides into a selected pair of the pivot lock slots under a spring force; and a trigger operationally connected to the pivot lock bar at a back end of the bike carrying ray assembly; wherein pulling the trigger slides the pivot lock bar out of a selected pair of pivot lock slots, enabling the carrying rack to be pivoted upward into a compact position behind the motor vehicle, and downward into a deployed position for carrying a bike, wherein the compact and deployed positions are each lockable by the pivot lock bar disposed in a respective pair of the pivot lock slots.

The trigger is operationally connected to the pivot lock bar via a trigger cable slidably mounted in the bike carrying tray assembly and attached to the pivot lock bar.

The first and second wheel trays are each pivotally mounted to the bike carrying tray assembly for pivoting of said trays between a co-aligned laterally extending operational position and a forward position for compact shipping and storage.

The pivot ratchet is configured to allow the wheel retention arm to pivot through a reflex angle to provide inward pivoting of the wheel retention arm to lock the retention arm with the cross member pressed against the tire of the respective wheel, provide outward pivoting of the wheel retention arm to release the bike from the carrier, and provide further outward pivoting to provide a frame for a ramp to allow the bike to roll onto the first and second wheel trays.

Each wheel retention arm includes two parallel side arms and a cross member between them that contacts a tire of the respective wheel of the bike, wherein the cross member of each wheel retention arm is mounted between the parallel side arms at a selectable position along a length of the parallel side arms that allows the cross member to adjust for different diameters of bike wheels. In embodiments the parallel side arms and the cross member define an H-shaped or an inverted U-shaped retention arm.

The cross member of each wheel retention arm is mounted between the parallel side arms in respective opposed slots or opposed holes of a plurality of holes by a releasable mechanism.

The ramp includes an additional wheel tray disposed between the parallel side arms at a selectable position along a length of the parallel side arms.

The ramp is mountable between the parallel side arms of each wheel retention arm in respective opposed slots or opposed holes of a plurality of holes by a releasable mechanism.

A back end of the bike carrying tray assembly is configured to engage an add-on bike carrying tray assembly.

The back end of the bike carrying tray assembly includes holes to bolt the add-on bike carrying tray assembly to the bike carrying tray assembly.

BRIEF DESCRIPTION OF THE DRAWINGS

The invention is explained in the following description in view of the drawings that show.

DETAILED DESCRIPTION

Figure 1A:
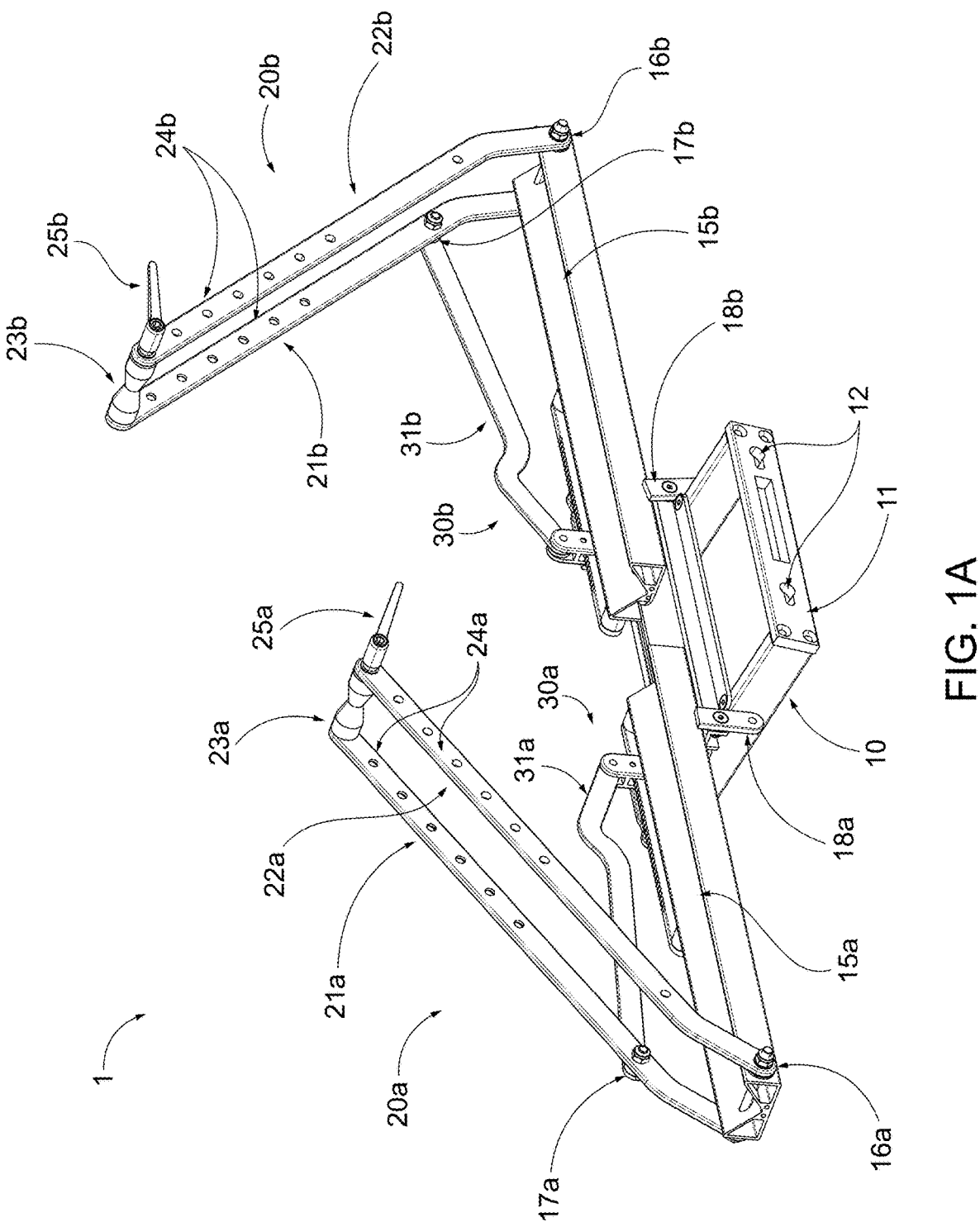
FIG. 1A shows a front perspective view of a rack with the wheel trays extended in operational configuration, according to an embodiment of the disclosed subject matter.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

"Bike" herein means a two-wheeled vehicle, including velocipede bicycles and motorcycles. "E-bike" or "electric bicycle" refers to a bicycle with an electric motor to propel the bicycle.

"Front," "rear" and "back" are oriented with a motor vehicle to which the bike carrier is attached. Thus, a "back view" of the hitch receiver carrier shows the carrier from the perspective of a viewer facing the back or rear of the motor vehicle. A "front view" shows the carrier as it faces the rear of the motor vehicle when the rack is attached to the motor vehicle. A "top" view shows the carrier viewed from above when it is oriented to carry a bike. Similarly, a "bottom" view shows the carrier viewed from below when it is oriented to carry a bike.

"H-shaped" or "inverted U-shaped" herein includes a range of positions of the cross member on the wheel retention arms. If the cross member is at the top of the side members it becomes an inverted U-shape. If the cross member is at a middle position of the side members it becomes an H-shape. "Inverted J-shaped" refers to a wheel retention arm having a single long side arm and a cross piece with a short side arm that wraps around a tire but is not pivotably connected directly to a wheel tray.

"Longitudinal" means parallel to the longest dimension of the subject component.

"Transverse" means perpendicular to the longest dimension of the subject component.

"Outer" or "Distal" refers to a position farthest from the center of the assembly under consideration. The distal point of a bicycle tire should be considered relative to the bicycle, and is the point farthest from the center of the bicycle. This is the front-most point of the front tire and the rear-most point of the rear tire.

"Outwardly:" In a direction away from the center of the assembly under consideration. The assembly is the rack unless otherwise stated.

"Velocipede:" A wheeled vehicle motivated by human power, such as a bicycle, tricycle, or quadricycle.

The objects of this invention are to provide a rack that (a) holds bicycles securely for use as an external carrier on motor vehicles; (b) can be loaded and unloaded quickly using only one operation comprising rolling a bike onto the carrier; (c) does not scratch the bicycle frame; (d) locks the steering wheel of the bicycle to prevent damage; (e) prevents the wheels from spinning in the vehicle slipstream; and (f) does not hold a wheel in front of the vehicle exhaust.

FIG. 1A shows a front view of a bike carrier 1 according to aspects of the invention. A frame 10 supports a bike carrying tray assembly comprising first and second wheel trays 15*a* and 15*b*. A bike is mounted on the carrier 1 by placing its wheels in respective wheel trays 15*a*, 15*b* with central channels to accommodate the bottoms of the bike wheels. Any rigid structural material may be used for the wheel trays, preferably extruded aluminum. These trays may be extrusions such as a U-channel or V-channel that are concave upward to retain the wheels and lock the steering of the bike. The trays 15*a*, 15*b* are shown in co-aligned laterally extended position to receive the wheels of a bike. Desirably, the carrier comprises a separate tray 15*a*, 15*b* for each wheel, enabling the trays to be folded together in a parallel configuration for compact shipping and storage (see FIG. 4).

A wheel retention arm 20*a*, 20*b* is respectively attached pivotally 16*a*, 16*b* near each end of the trays 15*a*, 15*b*. In the embodiment illustrated, the retention arms each comprise two parallel side arms 21*a*, 21*b* and 22*a*, 22*b* and a cross member 23*a*, 23*b* between them that contacts a tire of the respective wheel of the bike (not shown). The cross member of each wheel retention arm is releasably mounted between the parallel side arms at a selectable position by a releasable mechanism along a length of the parallel side arms that allows the cross member to adjust for different diameters of bike wheels. In the embodiment shown, each wheel retention arm has a plurality of holes 24*a*, 24*b* to adjust the position of the cross members 23*a*, 23*b* for different wheel diameters. The releasable mechanism may comprise an internal threaded shaft that passes through the cross member and opposed holes in the parallel side arms to engage a nut placed on the outside of one of the side arms. Levers 25*a*, 25*b* comprise an integral wrench to rotate the threaded shaft. They may be spring-loaded so that they may be selectively engaged to the threaded shaft for loosening or tightening when desired but not engage the shaft to minimize accidental rotation of the threaded shaft. Alternatively, the wheel retention arms may comprise elongated slots to adjust the position of the cross-members using a quick-release cam lever mechanism as described in U.S. Pat. No. 10,150,424, incorporated by reference herein. Depending on the position of the cross member, each retention arm is H-shaped or inverted U-shaped. Alternatively, the wheel retention arms may comprise an inverted J-shape, wherein the stays 31*a*, 31*b* are engaged to the longer arm of the J-shaped retention arm to control the pivot angle of the wheel retention arms. In a J-shaped retention arm, the length of the arm may be adjusted by the curved portion of the J-shaped arm engaged to one of a plurality of holes or an elongated slot in the arm, or by a telescoping shaft.

Figure 1B:
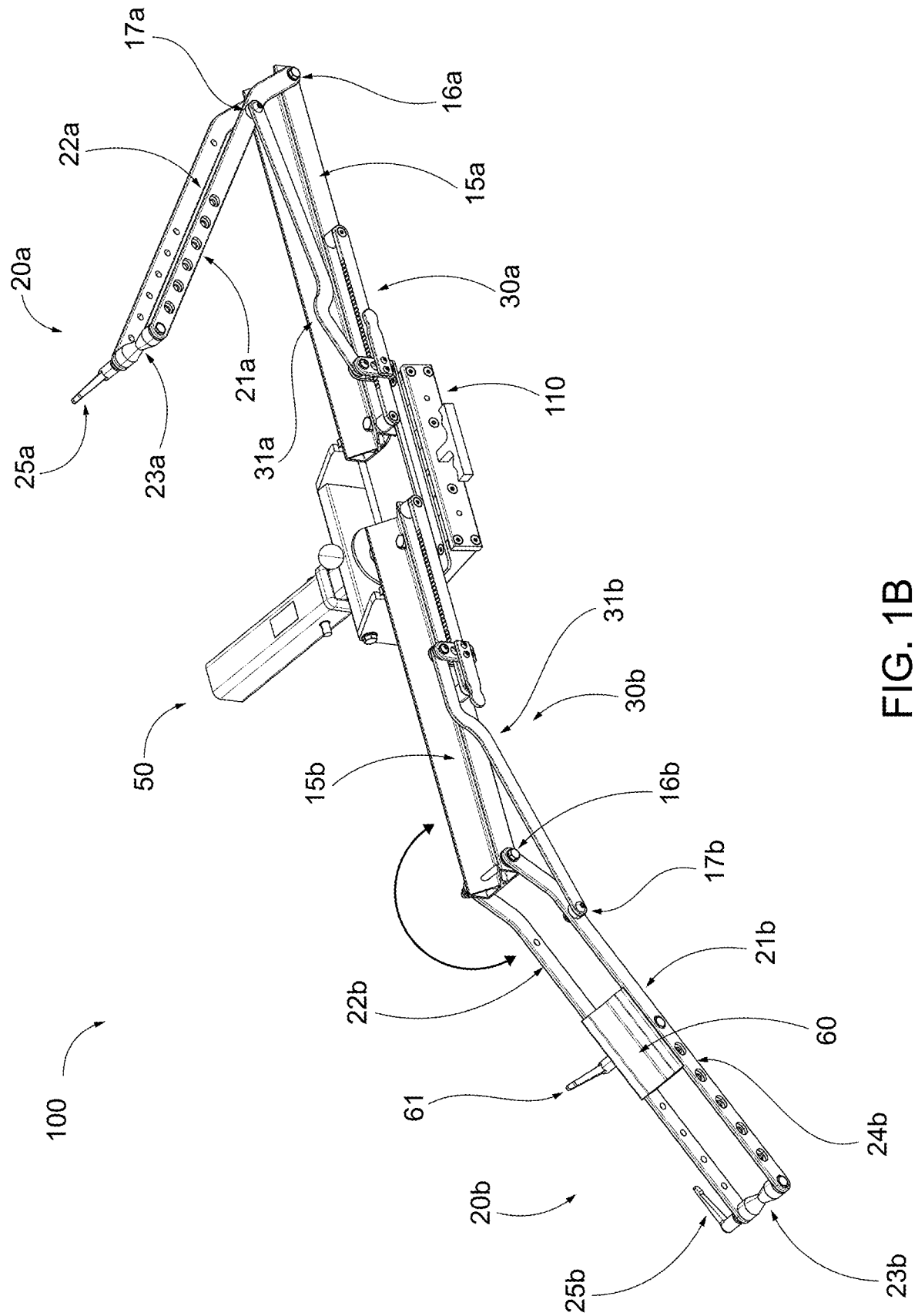
FIG. 1B shows a front perspective view of a rack further including a drawbar assembly with the wheel trays extended in operational configuration, according to an embodiment of the disclosed subject matter.

FIG. 1B shows a rear perspective view of an embodiment of a bike carrier 100 as described above, further configured for mounting to a tubular trailer hitch receiver on a motor vehicle, comprising a drawbar assembly 50 attached to the bike carrying tray assembly. Carrier 100 may be considered as a main bike carrier assembly when used in conjunction with an add-on tray as described further below.

In embodiments, the wheel retention arms are configured to pivot through a reflex angle from a horizontal closed position over the wheel trays through an intermediate wheel engagement position to a below-horizontal position that provides a frame to support a ramp insert that allows a bike to roll onto the wheel trays. FIG. 1A shows retention arm 20*a* pivoted inward and shows retention arm 20*b* in a wheel engagement position as described further below. FIG. 1B shows retention arm 20*b* in a ramp position to allow a bike to roll onto the bike carrier for easy loading. As indicated by the curved arrow, retention arm 20*b* can be disposed in a closed horizontal position over wheel tray 15*b* for when the rack is not in use. Each retention arm is configured to independently rotate through a reflex angle represented by the curved arrow. A ramp insert 105 is disposed between the side arms 21*b* and 22*b* by a releasable mechanism. The ramp insert may be configured as a short additional wheel tray with flanges that rest on parallel side arms 21*b*, 22*b*. In embodiments, the releasable mechanism may comprise an internal threaded shaft that passes through the ramp insert and opposed holes in the parallel side arms to engage a nut placed on the outside of one of the side arms, similar to mounting cross member 23*b*. Lever 106 comprises an integral wrench to rotate the threaded shaft, similar to levers 25*b*, 25*b*.

Each retention arm 20*a*, 20*b* pivots inward until the cross member 23*ab*, 23*b* contacts the tire of the nearest wheel of the bike. The arm is locked against this tire by a pivot lock, e.g., ratchet mechanism 30*a*, 30*b* acting through a stay 31*a*, 31*b* connected between the pawl (see FIG. 2) and the retention side arm 21*a*, 21*b*. This causes the tires to be bracketed between the arms, securing the bike in all directions by its tires. Stays 31*a*, 31*b* comprise a reverse curve or S-curve to allow the wheel retention arms to rotate through a reflex angle, shown in FIG. 1B by the double-headed arrow. For example, the wheel retention arm may rotate from an inward horizontal configuration for storage to an outward below-horizontal configuration for loading a bike onto the carrier. In embodiments, the angle of retention arm rotation may be from 190 to 230 degrees, preferably from 200 to 220 degrees, such as about 210 degrees. The retention arms pivot fully inward to the tray when the rack is not in use. Once adjusted and positioned for a given bike size, only one of the retention arms needs to be pivoted for insertion and removal of a bike of that size.

Each arm contacts the tire of the nearest wheel at a point above and outward from the wheel axle with respect to the bike, preferably for example about 45 degrees upward from hub level. This brackets and blocks the bike from moving, both along the tray and vertically. The bike is held firmly in place and cannot bounce upward or roll off the tray. The arms contact only the tires.

Figure 2:
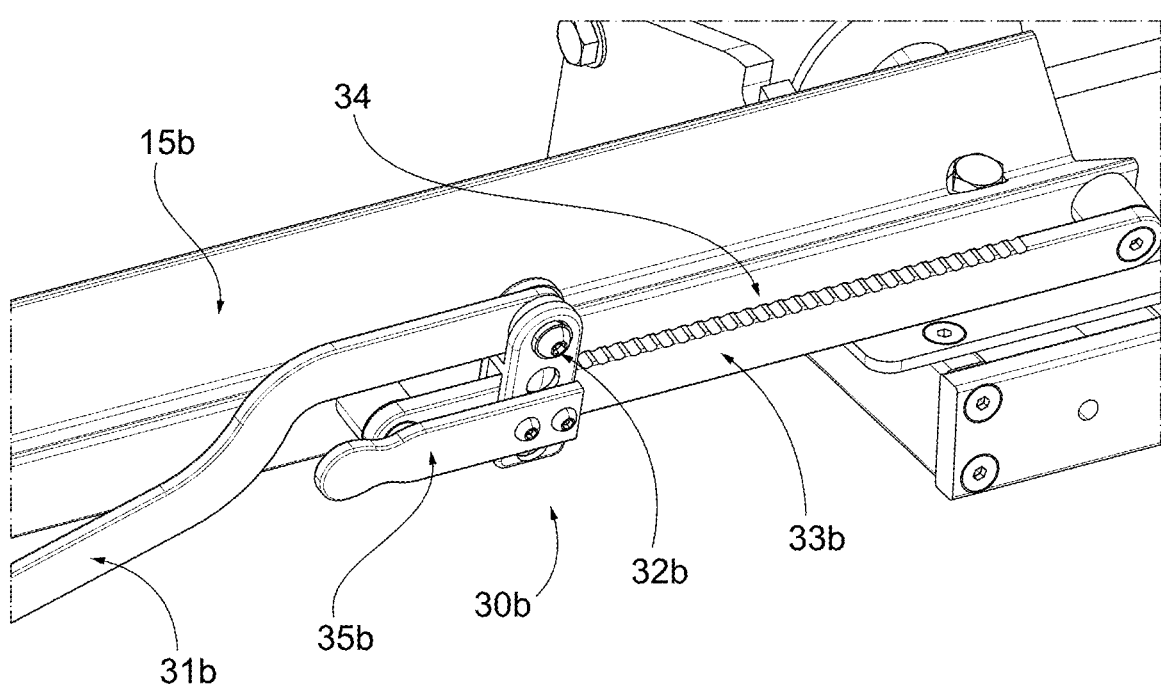
FIG. 2 shows a rear perspective close-up view of a rack showing a ratchet mechanism for pivoting wheel retention arms, according to an embodiment of the disclosed subject matter.

The pivotal position of each wheel retention arm is controlled by a linear ratchet with ratchet teeth. The ratchet mechanism prevents outward pivoting of the wheel retention arms unless intentionally released. FIG. 2 is a perspective view of an embodiment of a linear ratchet mechanism 30*b* that holds the wheel retention arm 20*b* tight against a tire. The wheel retention arm 20*b* is held against the tire by a stay 31*b* between pivot point 17*b* on side arm 21*b* of retention arm 20*b* (see FIG. 1B) and the pawl frame 32*b* of the ratchet mechanism 30*b*. A linear ratchet bar 33*b* has a top side with teeth 34. Upward force on a release arm 35*b* releases the pawl, allowing the retention arm 20*b* to be pivoted outward to mount or dismount a bike in the wheel tray. Ratchet mechanism 30*a* is similar.

An alternative ratchet mechanism is described in U.S. Pat. No. 9,956,922, incorporated herein by reference. It comprises a linear ratchet bar having a pawl assembly that holds a finger against the bottom side of the ratchet bar. A pawl release lever releases the finger from the ratchet bar. An over-rotation stop prevents over-rotating the pawl assembly in the release direction. The linear ratchet bar 34 has a bottom side with teeth 35. Upward force on the release lever releases the pawl, allowing the retention arm to be pivoted outward to mount or dismount a bike in the tray. A torsion spring urges the pawl frame in a direction that moves the pawl finger against the teeth. Tension on the stay is caused by the cross member of the retention arm being pressed against the bike tire. This tension jams the finger against the teeth due to a follower on the top side of the ratchet bar acting as a fulcrum. Any force that tends to pivot the retention arm outward locks the pawl on the ratchet harder. Upward manual force on the pawl lever opposes and overrides the force of the torsion spring and pivots the pawl frame to move the finger away from the teeth. If the pawl frame is over-rotated, the finger will drag along the teeth during outward pivot of the wheel retention arm to release the bike. An over-rotation stop prevents this by contacting the top of the ratchet bar, stopping the rotation of the pawl frame caused by a user lifting the lever. It can be stopped at the maximum distance of the finger from the bottom of the ratchet bar.

Figure 3:
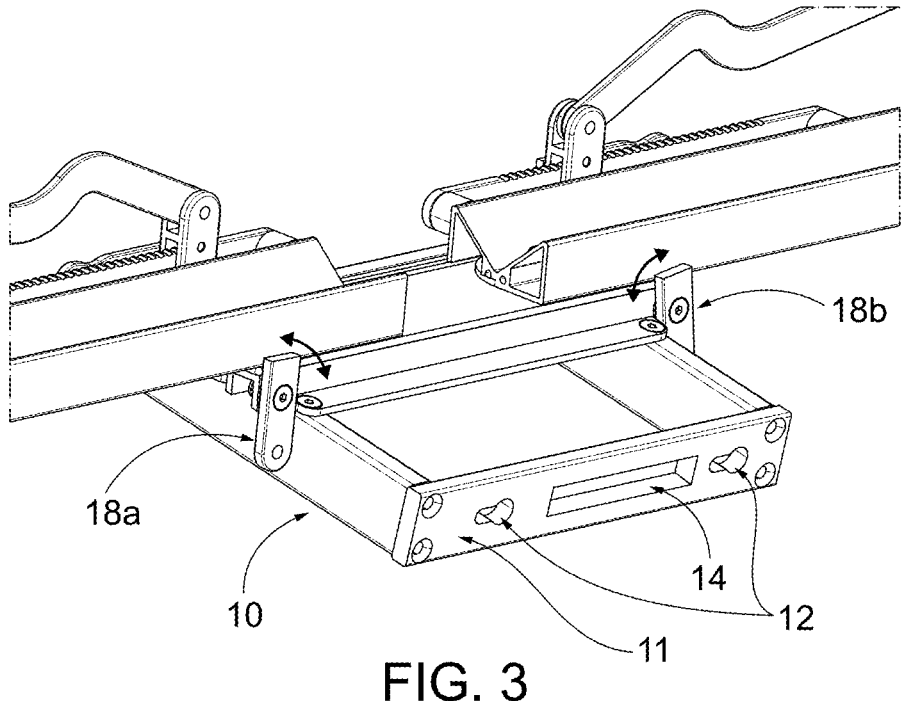
FIG. 3 shows a front perspective close-up view of a rack showing tray stops for pivoting wheel trays, according to an embodiment of the disclosed subject matter.

FIG. 3 shows a close-up view of the frame 10 of carrier 1 as shown in FIG. 1. Keyholes 12 in front face 11 of frame 10 are configured to receive heads of threaded bolts (not shown) for bolting the carrier 1 to carrier 100 as an add-on tray to carry a second bike when carrier 100 is used as a main bike carrier attached to a motor vehicle using drawbar assembly 50 as described below. Slot 14 is configured to allow trigger handle 73 (see below) to pass through. Not shown in this view are threaded holes in a rear face of frame 10 that receive threaded bolts to attach an additional add-on tray (i.e. an additional carrier 1) to carry an additional bike. Alternative embodiments for attaching an add-on tray to a main tray include a quick release mechanism or spring-loaded pins. Pivoting stops 18*a* and 18*b* in the vertical orientation as shown lock the wheel trays 15*a*, 15*b* in the coaligned operational position. When stops 18*a* and 18*b* are rotated into a horizontal configuration as indicated by the double headed arrows, they allow trays 15*a*, 15*b* to be pivoted into a parallel storage configuration as shown in FIG. 4.

Figure 4:
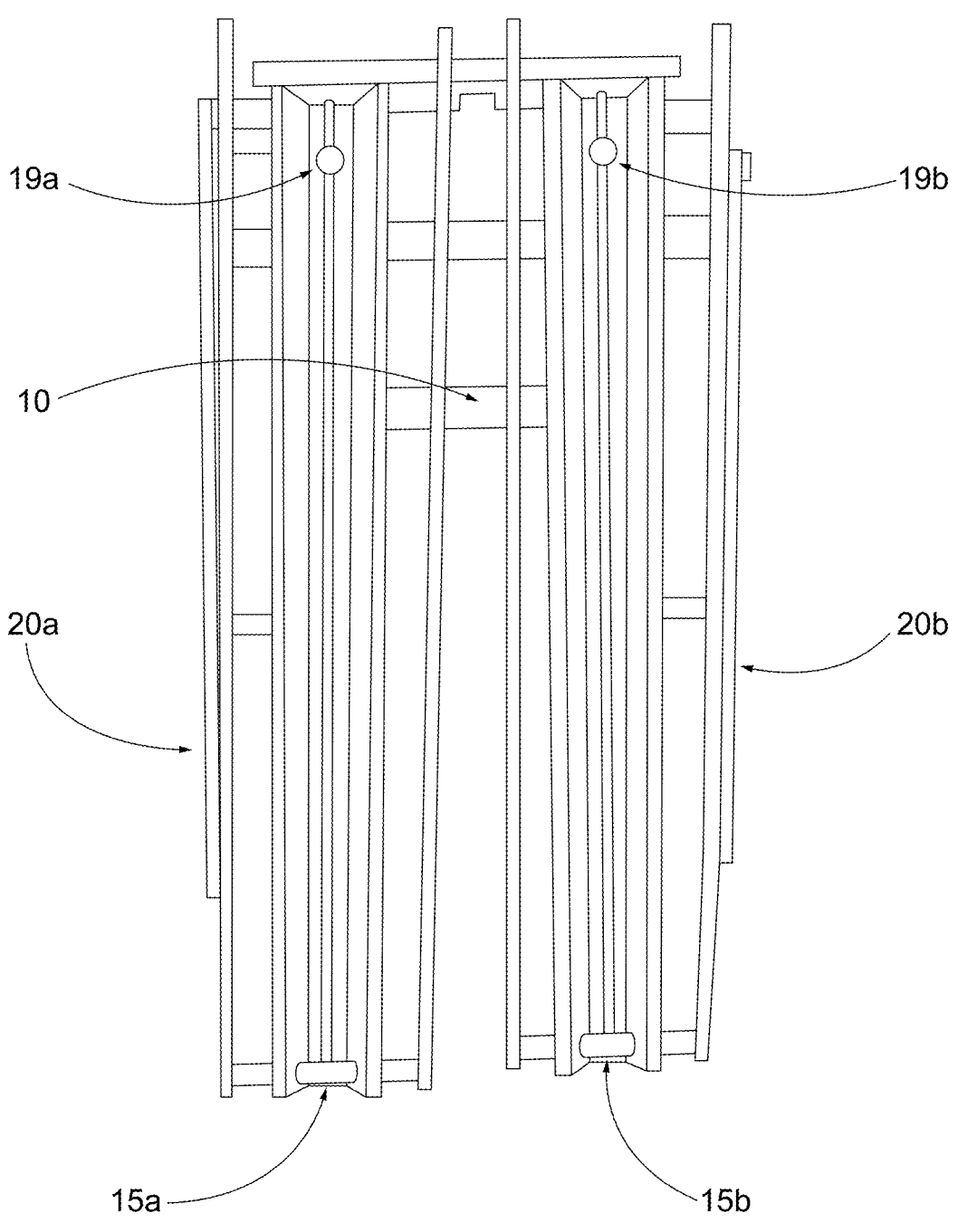
FIG. 4 shows a top view of a rack with the wheel trays rotated into a compact storage configuration, according to an embodiment of the disclosed subject matter.

FIG. 4 is a top view of the bike carrier of FIG. 1 with the wheel retention arms 20*a*, 20*b* folded down to the wheel trays 15*a*, 15*b*. The trays 15*a*, 15*b* are mounted to the frame 10 by respective pivot attachments 19*a*, 19*b*, so they can pivot between the operational co-aligned laterally extending position shown and a compact parallel position over the frame 10 for shipping and storage.

Alternatively, as described in U.S. Pat. No. 9,956,922, incorporated herein by reference, a tray lock bar may be slidably mounted in a vertical slot, and is spring loaded upward to a stopping point immediately beside the trays. The tray lock bar is pushed down to release the trays so they can be rotated together over the frame 10 via their pivot connections 19*a*, 19*b* to the frame 10. In this embodiment, the wheel tray lock bar automatically and releasably locks the wheel trays in the operational position. Other embodiments for automatically locking the trays in the operational configuration are described in U.S. Pat. Nos. 10,065,568; 10,086,769 and 10,124,740, each incorporated herein by reference.

Figure 5A:
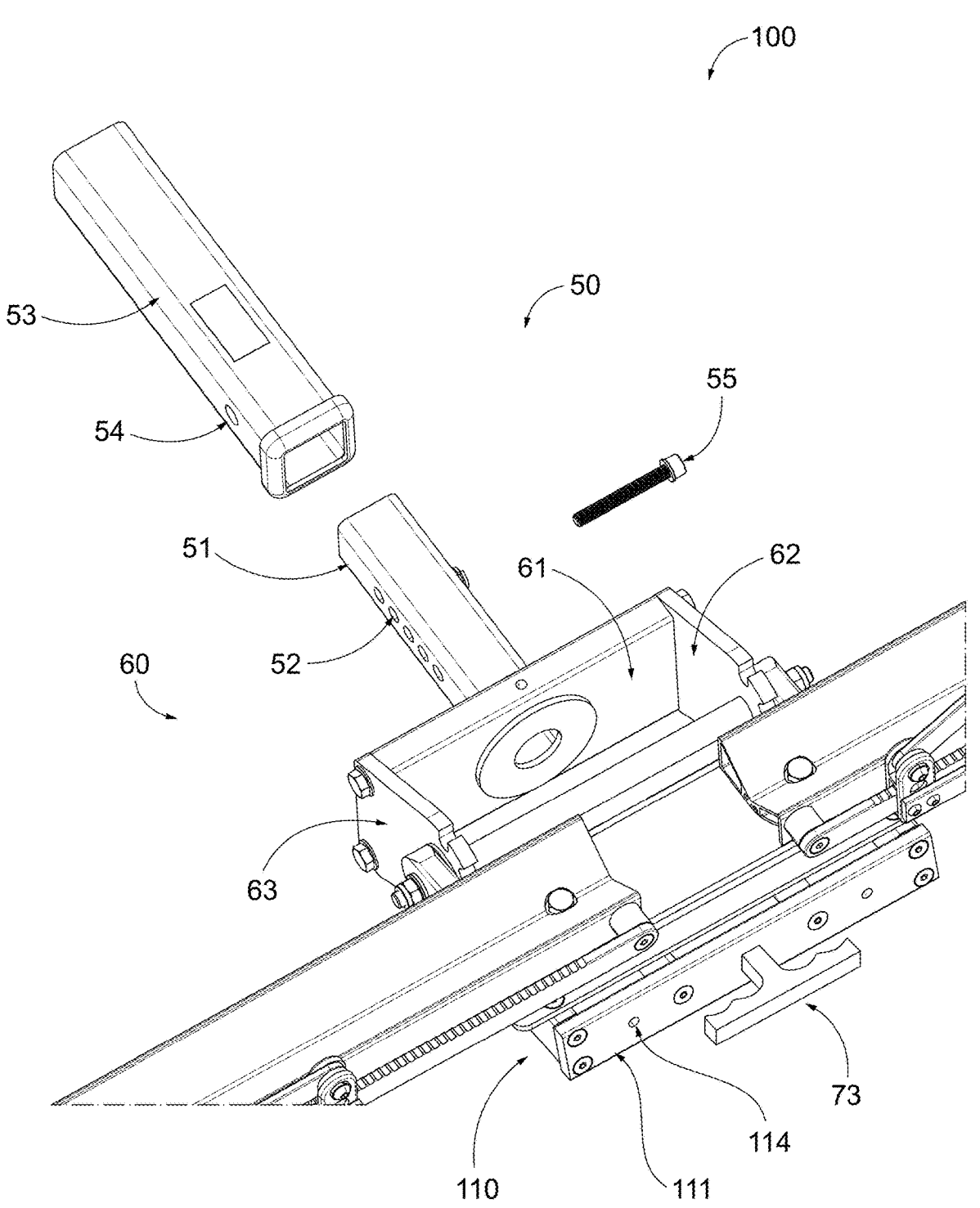
FIGS. 5A-C show close-up top perspective views of drawbar and pivot assemblies, according to embodiments of the disclosed subject matter.
Figure 5B:
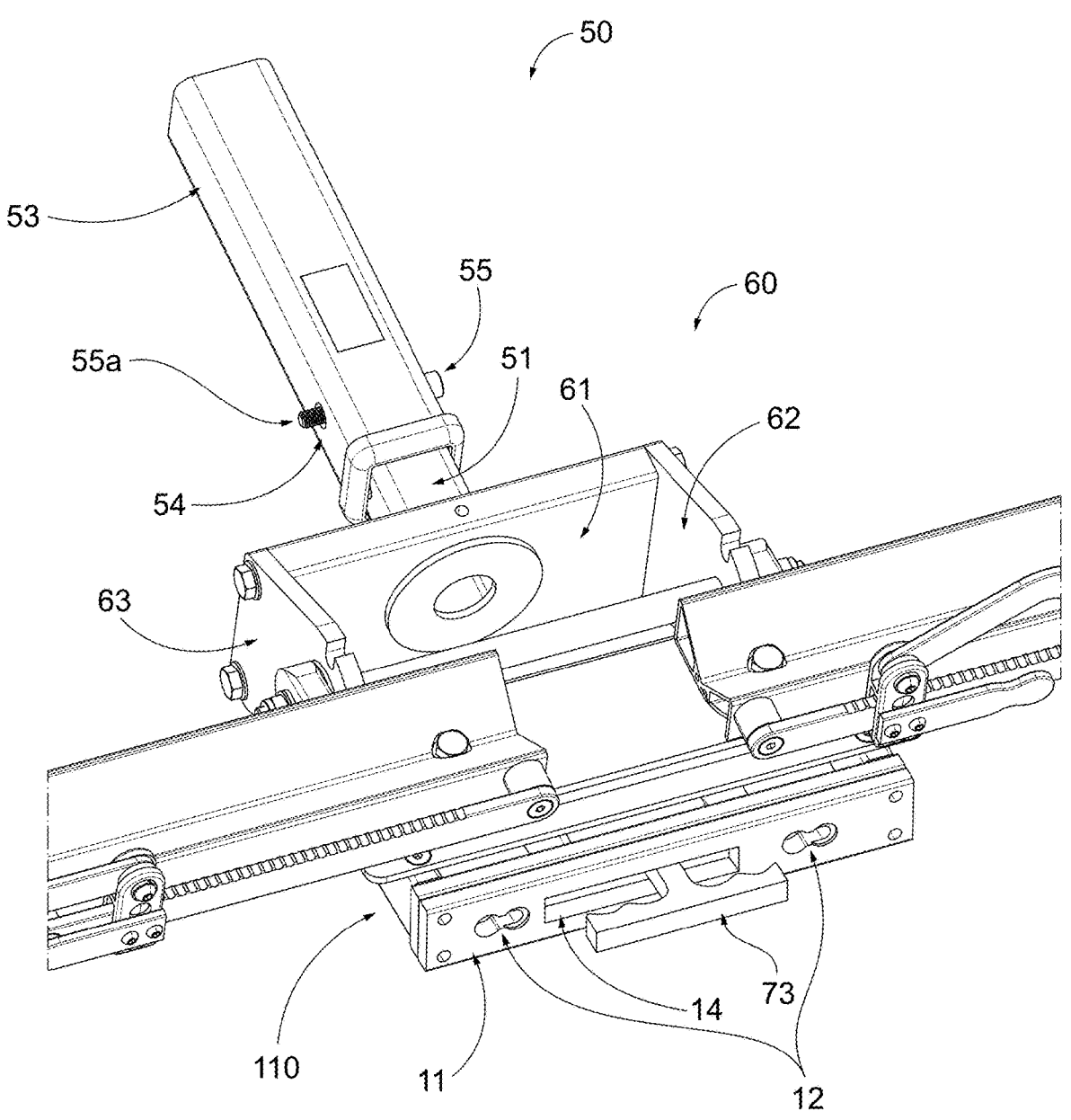
Figure 5C:
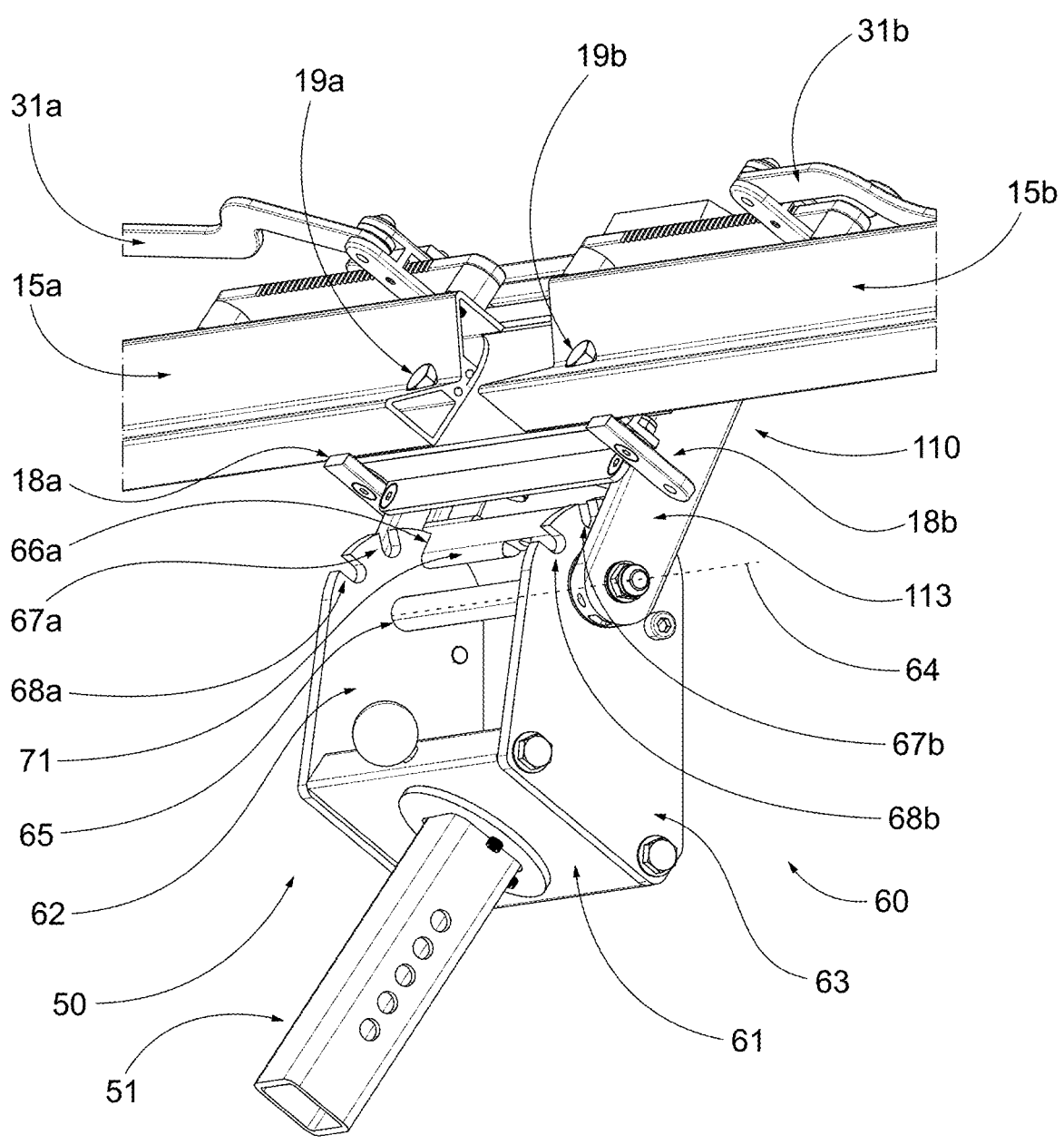

FIGS. 5A and 5B show top rear close-up views of the drawbar assembly 50 of carrier 100. FIG. 5C shows a top front close-up view of the drawbar assembly 50 of carrier 100. FIG. 5A shows a partially exploded view, in which the draw bar assembly 50 comprises a hollow trailer hitch drawbar 51, which is configured to slidingly engage the interior of a trailer hitch receiver 53 attached to a motor vehicle (not shown). In embodiments, drawbar 51 comprises a plurality of opposed holes 52 and trailer hitch receiver 53 comprises at least one pair of opposed holes 54. A shaft 55 is configured to pass through holes 52 and 54 to attach the drawbar 51 to the receiver 53. FIG. 5B shows the drawbar 51 engaged inside receiver 53. In embodiments, the shaft 55 is threaded to engage a threaded hole 54 to secure the drawbar to the receiver. Alternatively, shaft 55 extends beyond the receiver 53 as shown in FIG. 5B and the protruding end 55*a* can be secured with a nut or locking device (not shown) engaged to end 55*a* of shaft 55. Other embodiments for engaging the drawbar 51 to the receiver 53 are described in U.S. Pat. Nos. 9,902,222; 9,956,922; 10,005,329; 1,065,568; 10,603,968 and 11,148,492, each incorporated herein by reference.

FIG. 5B also shows the front plate 11 of the carrier 1 attached to the main tray assembly frame 110 when the carrier 1 is used as an add-on tray. For ease of illustration, the remainder of carrier 1 is not shown. Bolts (not shown) engaged to keyholes 12 in the front face 11 are screwed into holes 114 in the rear face 111 of the frame 110 (see FIG. 5A) to attach the carrier 1 to carrier 100. Trigger handle 73 passes through slot 14 when carrier 1 is attached to carrier 100.

As shown in FIG. 5A-C, the trailer hitch drawbar 51 is attached to the tray assembly via a drawbar pivot assembly 60 comprising a front face 61 attached to the drawbar 51, and right (first) and left (second) vertically oriented side plates 62, 63 attached to the front face 61. The main tray frame assembly 110 comprises right (first) and left frame (second) side plates 112 (see FIG. 6A), 113 attached to the drawbar assembly on a horizontal pivot axis shown as dashed line 64, allowing the tray assembly to pivot upward about the axis to a compact upward position behind the motor vehicle as shown in FIG. 6B. The pivot axis may be implemented by a pivot axle (not shown) journaled in a pivot cross member 65 between the side plates 62, 63 that serves as a structural member of the drawbar assembly. The pivot position is locked with a pivot lock bar 71 operated by a trigger cable 72 via a manual trigger handle 73 at the back of the main tray assembly 110, as further described below. In alternative embodiments, trigger cable 72 may be replaced by a bar or rod (not shown).

As shown in FIG. 5C, a plurality of pivot lock slots or detents 66*a*, 67*a* and 68*a* in side plate 62 define positions for the pivot lock bar 71 to engage and hold the main tray assembly frame 110 in positions relative to the pivot assembly 60. Corresponding detents 67*b* and 68*b* are shown in side plate 63 (a detent corresponding to 66*a* is not visible in this view). When lock bar 71 is engaged in detent 66*a*, it disposes the main tray assembly in a substantially horizontal position relative to the motor vehicle to which the carrier is attached via drawbar assembly. When lock bar 71 is engaged in detent 67*a*, it disposes the main tray assembly in a substantially diagonal position relative to the motor vehicle. When lock bar 71 is engaged in detent 68*a*, it disposes the main tray assembly in a substantially vertical position relative to the motor vehicle.

As discussed previously for carrier 1, pivoting stops 18*a* and 18*b* in the vertical orientation as shown in FIG. 5C lock the wheel trays 15*a*, 15*b* in the coaligned operational position. When stops 18*a* and 18*b* are rotated into a horizontal configuration, they allow trays 15*a*, 15*b* to be pivoted into a parallel storage configuration as shown in FIG. 4.

Figure 6A:
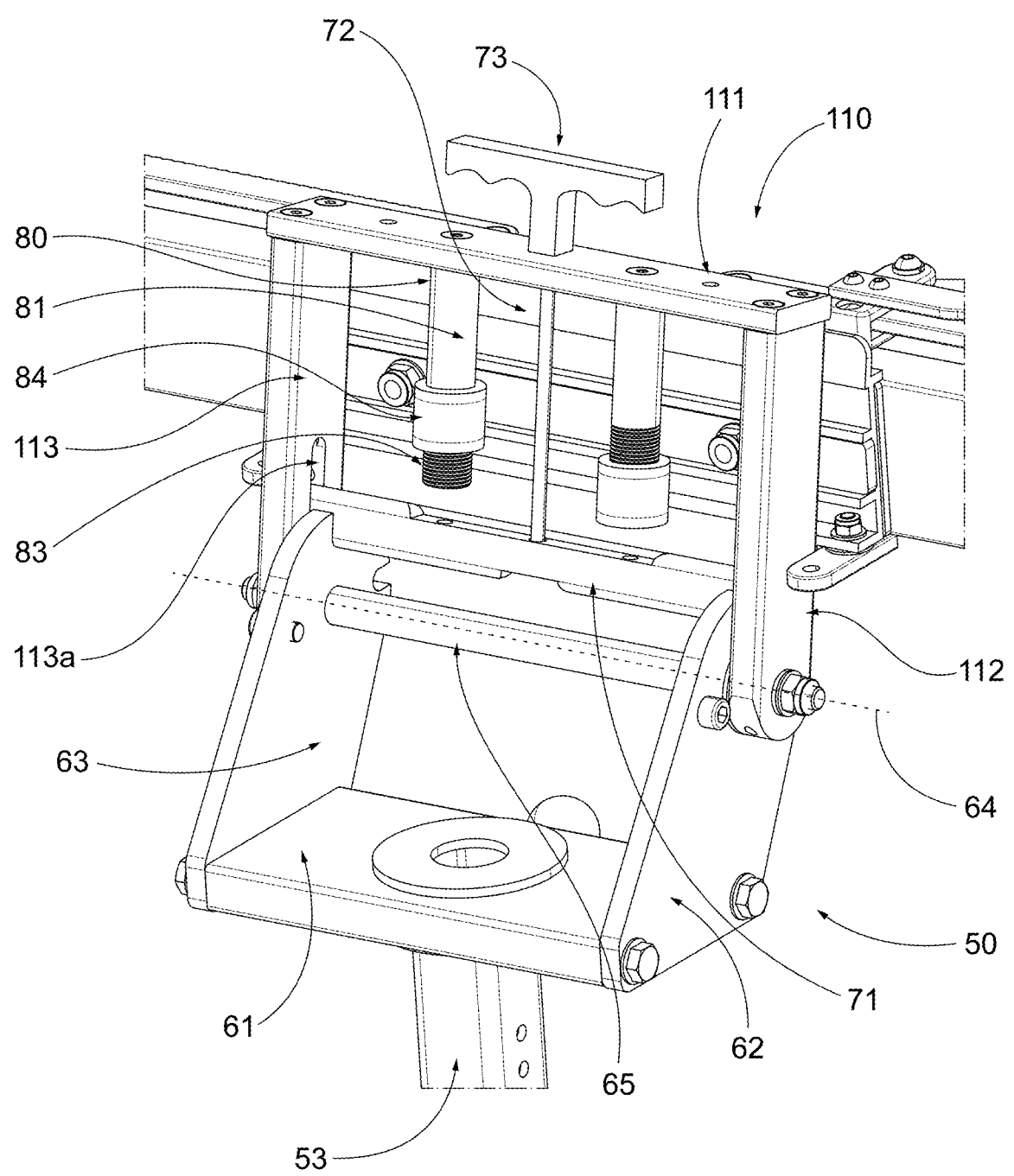
FIGS. 6A-C show close-up bottom perspective views of drawbar and pivot assemblies, according to embodiments of the disclosed subject matter.
Figure 6B:
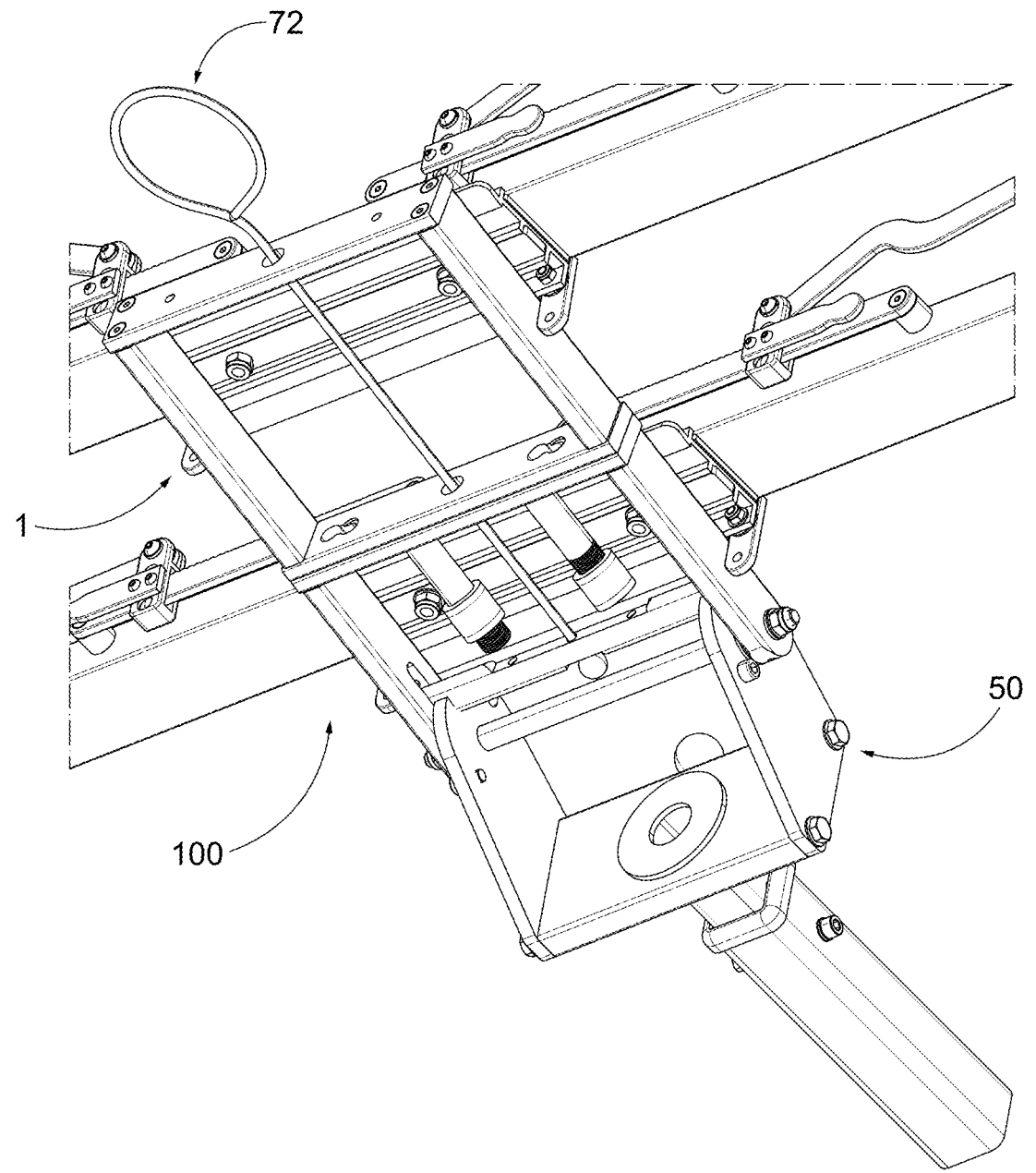

FIG. 6A shows a bottom close-up view of an embodiment of the carrier 100. Handle 73 is operationally connected to pivot lock bar 71 via trigger cable (or rod) 72. Pulling handle 73 toward the rear of the carrier 100 pulls trigger cable (or rod) 72 so that pivot lock bar 71 is pulled toward the rear of the frame 110, thereby disengaging lock bar 71 from detent 66*a* and allowing the tray assembly frame 110 to be pivoted relative to the relative to the pivot assembly 60. Slot 113*a* in side plate 113 guides lock bar 71 into and out of the detents. A corresponding slot in side plate 112 is not visible in this view. The carrier also included one or two spring assemblies 80. The embodiment shown in FIG. 6A shows two spring assemblies 80, each comprising a spring support member 81 and a spring 82 (see FIG. 6C) disposed between the spring support member 81 and the lock bar 71. Spring 82 urges the lock bar 71 toward the detents so that it is held in place in the detents unless the handle 73 is pulled rearward against the force of the spring 82. Optionally, the spring support member 81 comprises a threaded portion 83 that is engaged to a threaded collar 84 (see FIG. 6C). Collar 84 can be disposed toward the rear of the carrier so that the lock bar 71 can be pulled rearward as shown at the left. When collar 84 is disposed in contact with lock bar 71 as shown at the right, it prevents lock bar 71 from moving out of the detents it is engaged with, further preventing accidental movement of the carrier relative to the draw bar.

FIG. 6B shows a close-up view of a main tray assembly 100 with an attached add-on assembly 1. In this view, trigger cable 72 extends through the add-on assembly 1 so a user can pull the cable rearward to pull the lock bar out of the detents so that the tray assembly can be pivoted from an operational configuration to a storage configuration. Optionally, the cable may incorporate a handle such as handle 73 (not shown in this figure) to make pulling the cable easier for a user.

Figure 6C:
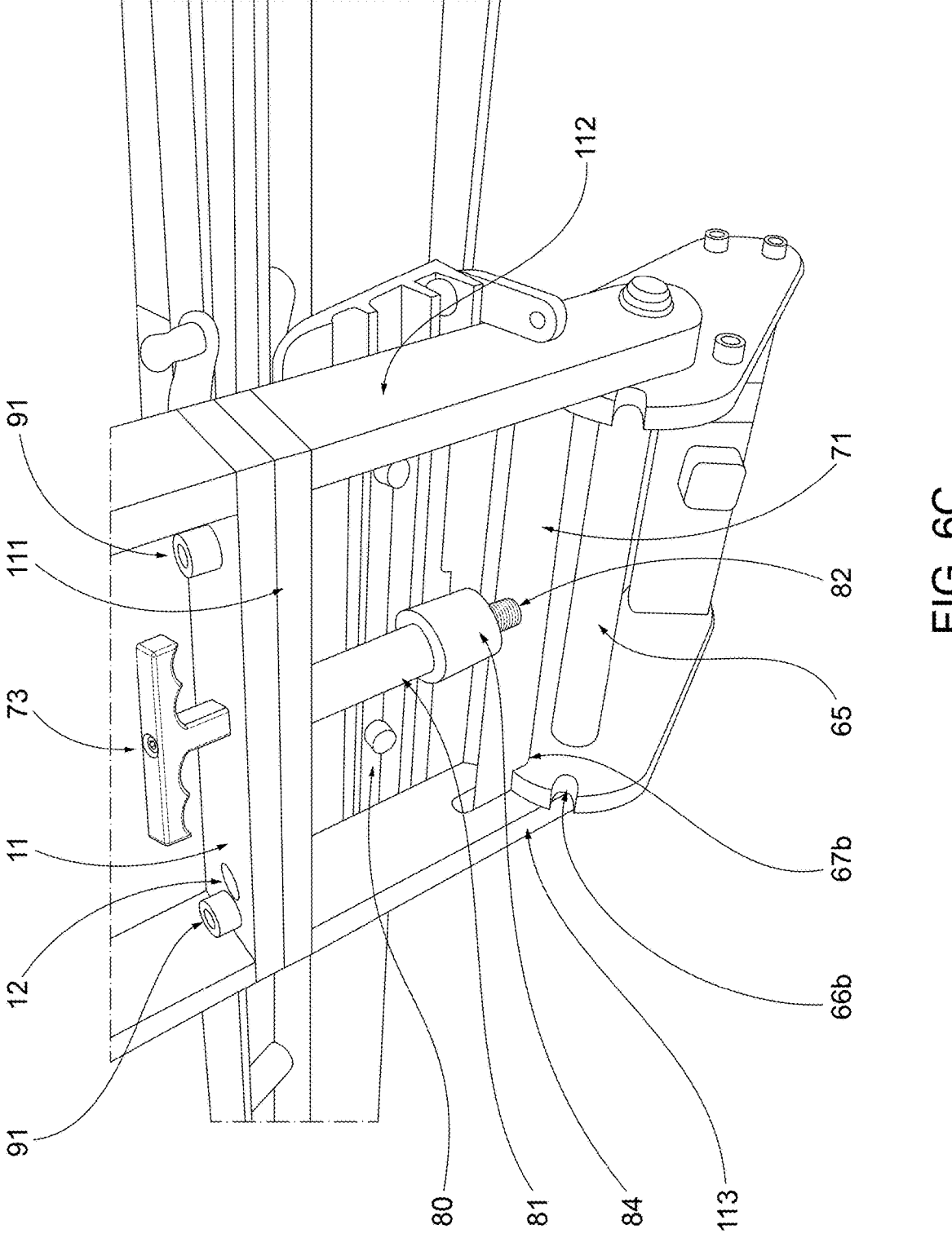

FIG. 6C shows an embodiment with a single, central spring assembly 80. In this embodiment, a trigger cable 72 (or rod) is disposed within a lumen defined by hollow support member 81 and spring 82 and connected between handle 73 and lock bar 71. An alternative embodiment (not shown) comprises a single, central spring assembly 80 and two trigger cables (or bars), each disposed between the spring assembly 80 and the ends of lock bar 71. The pivot lock bar 71 is engaged in detents 67*b* and 67*a* (not shown in this view) so that the tray assembly is disposed diagonally upward relative to the drawbar assembly and the vehicle to which it is attached. Bolts 91 in keyholes 12 connect the front face 11 of a carrier 1 to the rear face 11 of carrier 100.

Figure 7A:
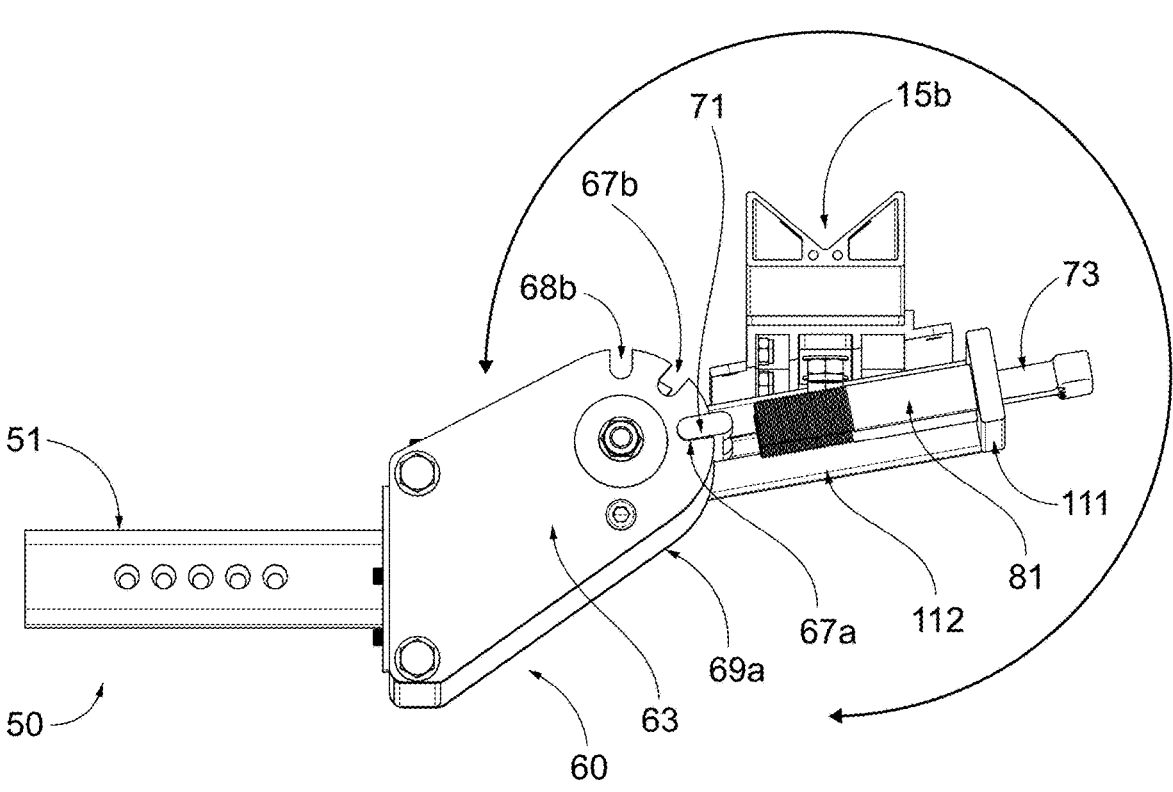
FIG. 7A shows a side view of a bike carrier with a drawbar and pivot assemblies in an operational configuration, according to embodiments of the disclosed subject matter.
Figure 7B:
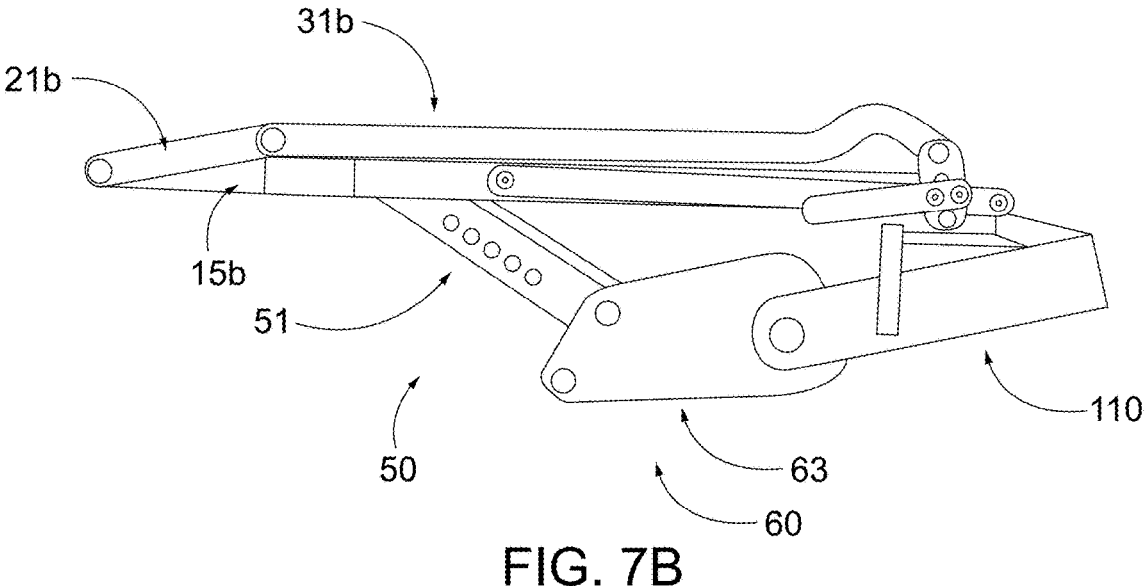
FIG. 7B shows a side view of a bike carrier with a drawbar, pivot assemblies and wheel trays in a folded configuration, according to embodiments of the disclosed subject matter.
Figure 7C:
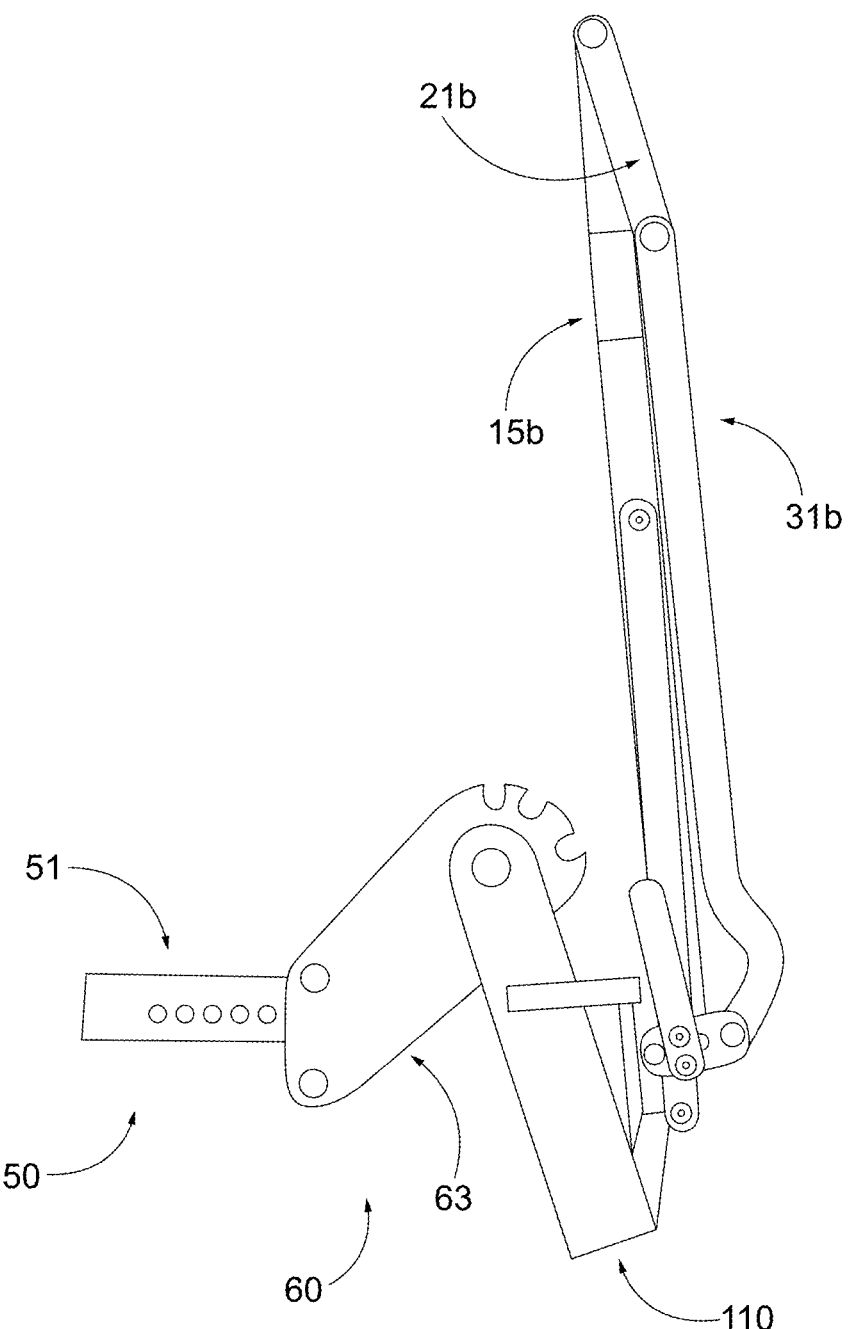
FIG. 7C shows a side view of a bike carrier with pivot assemblies and wheel trays in a folded configuration, according to embodiments of the disclosed subject matter.

FIG. 7 is a side view of the drawbar assembly 50, pivot assembly 60, and main tray frame assembly 110, with a number of parts removed to allow for simpler depiction. Notably, side plate 113 is removed to show how the pivot lock bar 71 and spring support member 81 are aligned relative to the pivot assembly 60. Pivot lock bar 71 is slidably mounted on the main tray frame 110 and falls into a selected one of these slots under force of a spring 82. In the illustration, pivot lock bar 71 is engaged in detent 67*a*, disposing the tray assembly substantially horizontally. As shown, the tray assembly is canted upward about 5-10 degrees from true horizontal. Trigger cable 72 (not visible in this view) extends from the lock bar 71 to trigger handle 73 at the back of the main tray assembly 110. Pulling the trigger handle releases the pivot lock bar 71 from the slot 66*b*, allowing the tray assembly to be rotated as shown by the double headed arrow. When pivot lock bar 71 is engaged to the slot 67*b*, the tray assembly is disposed diagonally upward. When pivot lock bar 71 is engaged to the slot 68*b*, the tray assembly is disposed substantially vertical. As discussed above, tray 15*b* and tray 15*a* (not visible) can be pivoted from the extended position shown here to a parallel configuration. When pivot lock bar 71 is rotated to a position between slot 66*b* and 67*b*, and the wheel trays are disposed in parallel configuration, the tray assembly is disposed over the drawbar assembly 50 for storage or transport as shown in FIG. 7B. When pivot lock bar 71 is rotated to a position indicated by 69*b* and the wheel trays are in parallel configuration, the trays can be carried on the back of a vehicle vertically as shown in FIG. 7C.

In embodiments, the drawbar assembly further comprises a rotational pivot assembly coupled to the drawbar and the bike carrying tray assembly configured to pivot the bike carrying tray assembly among a horizontal position, a first downward position and a second downward position. In these embodiments, the entire tray assembly can tilt to a first downward position so that one end of the carrier is proximate to the ground level, allowing one to roll a bike directly onto the carrier. Once the bike is locked onto the carrier by positioning the wheel retention arms in contact with the bike tires, the rack can be pivoted back to the horizontal position to transport the bike. The bike can be unloaded from the carrier by tilting the carrier to either the first downward position or the second downward position, disengaging the wheel retention arm on the downward positioned end of the carrier from the respective tire and rolling the bike off the carrier onto the ground.

Figure 8A:
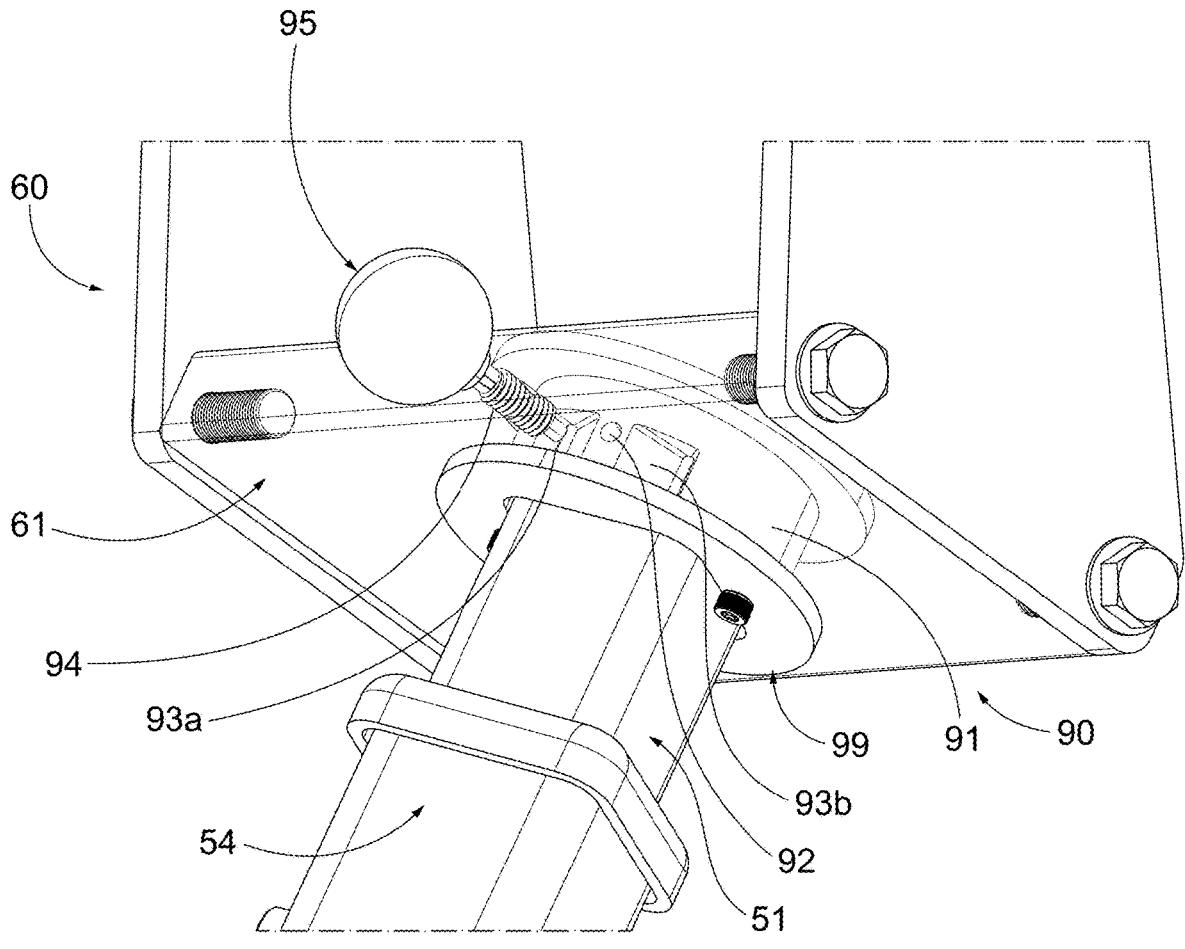
FIG. 8A shows a top perspective view of a bike carrier with a pivot ring, according to embodiments of the disclosed subject matter.
Figure 8B:
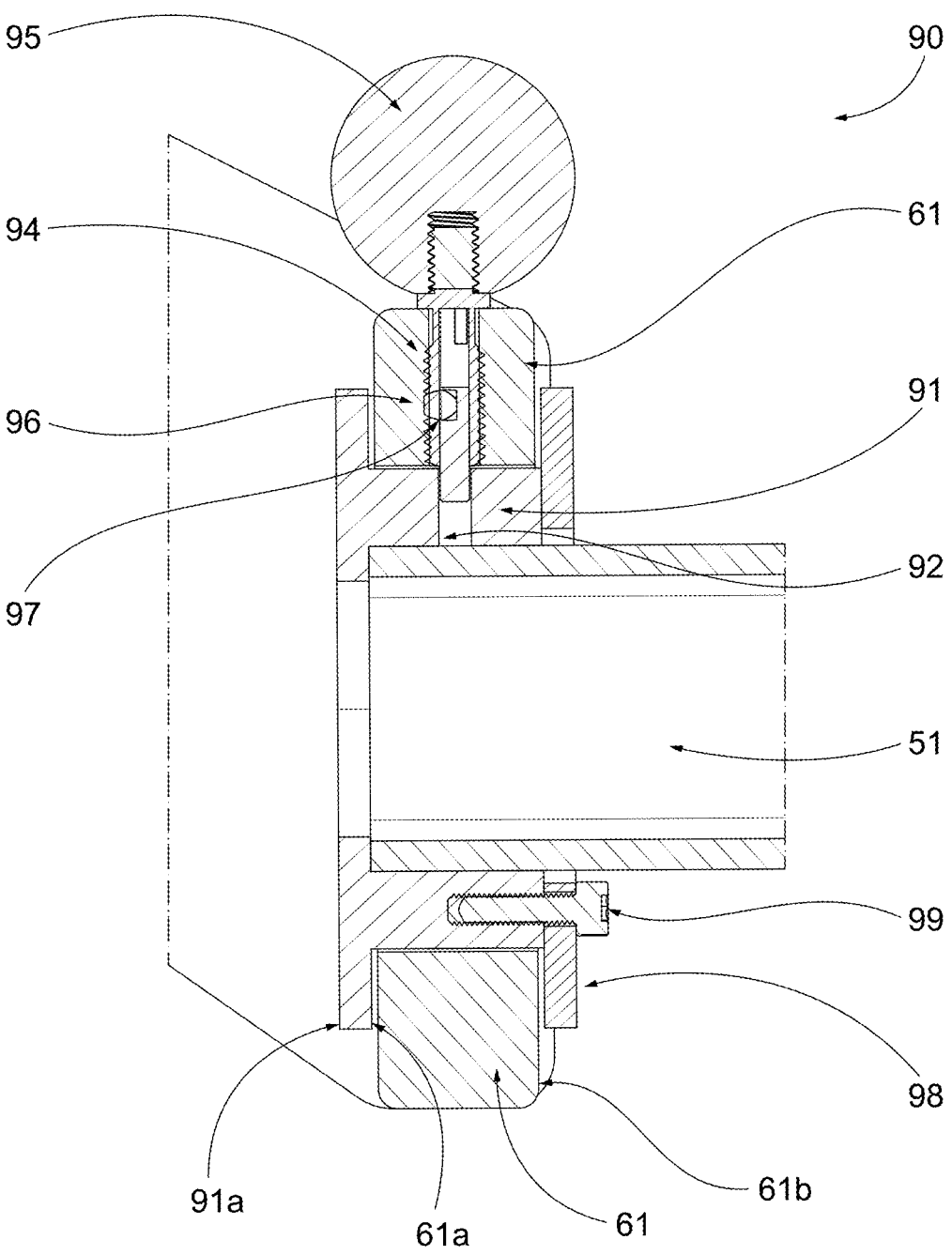
FIG. 8B shows a cross section view of a bike carrier with a pivot ring, according to embodiments of the disclosed subject matter.

FIG. 8A shows a top front perspective view of the rotational pivot assembly 90 and FIG. 8B shows a cross-section view of the rotational pivot assembly 90. As shown in FIGS. 8A and 8B, the rotational pivot assembly 90 comprises a pivot ring 91 disposed in the pivot front plate 61 (shown as transparent for ease of illustration) comprising a positioning hole 92, a first bevel 93*a* and a second bevel 93*b*; and a spring loaded adjustment pin 94 configured to engage the positioning hole 92 to dispose the bike carrying tray assembly in a horizontal position, wherein pulling the spring loaded adjustment pin 94 from the positioning hole 92 allows the spring loaded adjustment pin to engage the first bevel 93*a* and tilt the first bike wheel tray (not shown) downward into the first downward position, or engage the second bevel 93*b* and tilt the second bike wheel tray (not shown) downward into the second downward position. Handle 95, shown in these illustrations as a knob or ball, allows a user to pull the spring-loaded adjustment pin upward, compressing the spring and disengaging the pin from the positioning hole 92, allowing the rack to be tilted relative to the drawbar 51. When the user releases the handle, the spring decompresses and pushes the pin toward the positioning hole 92 or the bevels 93*a* or 93*b*. Alternatively or additively, the handle may be rotatable so that a traveler 96 engaged in a helical groove 97 moves the pin 94 into or out of engagement with the pivot ring 91. As seen in FIG. 8B, the pivot ring 91 is fixedly engaged to draw bar 51. The pivot ring 91 comprises a circumferential flange 91*a* that engages the inner surface 61*a* of the front plate 61. Clamp ring 98 is attached to the pivot ring 91 by screw(s) 99 so that it engages the outer surface 61*b* of the front plate 61. This holds the pivot ring 91 in place inside a hole in the front plate 61 so that the front plate 61 is rotatably engaged to the pivot ring and the drawbar so that the carrier is tiltable when the drawbar is engaged to a drawbar receiver on a motor vehicle.

In embodiments of the bike carrier comprising the pivot ring, the carrier may pivot from a horizontal position (0° tilt) to a first downward position with a tilt range of −20° to −35°, such as −30°, where a first end of the carrier is tilted downward. The second downward position tilts the opposite or second end of the bike carrier downward. One can appreciate that this tilts the first end of the carrier upward with a tilt range of +20° to +35°, such as +30°. In either tilted orientation, the tilt provides that either the first or second end of the bike carrier is proximate the ground so a bike can be rolled onto the carrier.

Embodiments of the bike carrier disclosed herein comprise features wherein the wheel retention arms are configured to rotate through a reflex angle as described above to allow a bike to be rolled onto the carrier via a ramp supported by one of the retention arms, but the carrier does not have a pivot ring. In addition to being used to carry a bike behind a motor vehicle as described herein, a carrier 1 may be adapted to be configured as a roof-top carrier, where the ramp feature allows for easier loading of a bike onto the carrier. In the instance of a roof-top carrier, a wheel retention arm configured to rotate through a reflex angle may be rotated below horizontal, such as approximately parallel to the rear window or windshield of the motor vehicle so that one may roll the bike up the ramp onto the wheel trays above the roof of the vehicle. Other embodiments comprise features wherein the wheel retention arms are configured to rotate through a reflex angle as described above and the carrier has a pivot ring allowing the entire carrier to tilt relative to the drawbar. One may appreciate when the entire carrier can tilt to allow a bike to roll onto the carrier, the wheel retention arms need to be able to be rotated out of the way of the bike rolling onto the wheel tray, but the wheel retention arms do not necessarily need to rotate through a reflex angle to do so. Accordingly, embodiments of a bike carrier include the pivot ring feature but do not have wheel retention arms that do not rotate through a reflex angle, but instead rotate through an obtuse angle (>90° and <180°) so that the wheel retention arms can contact the ground when the carrier is tilted.

Figure 9A:
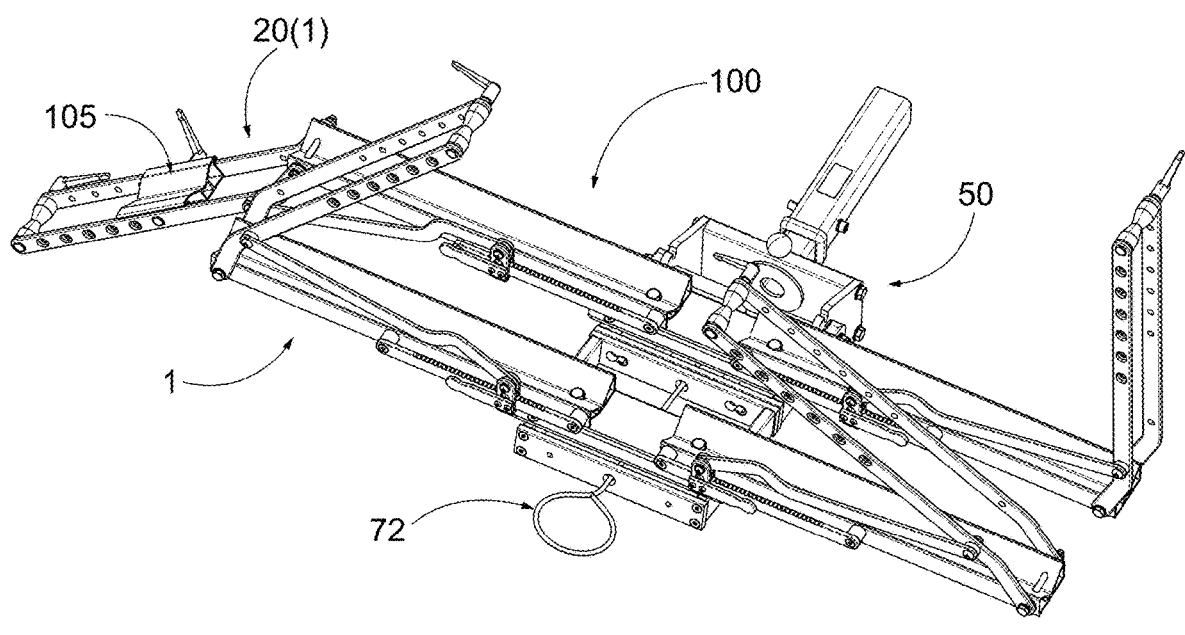
FIGS. 9A-B show perspective and top views of a carrier comprising a main carrier with a drawbar and an add-on carrier for carrying two bikes, according to embodiments of the disclosed subject matter.
Figure 9B:
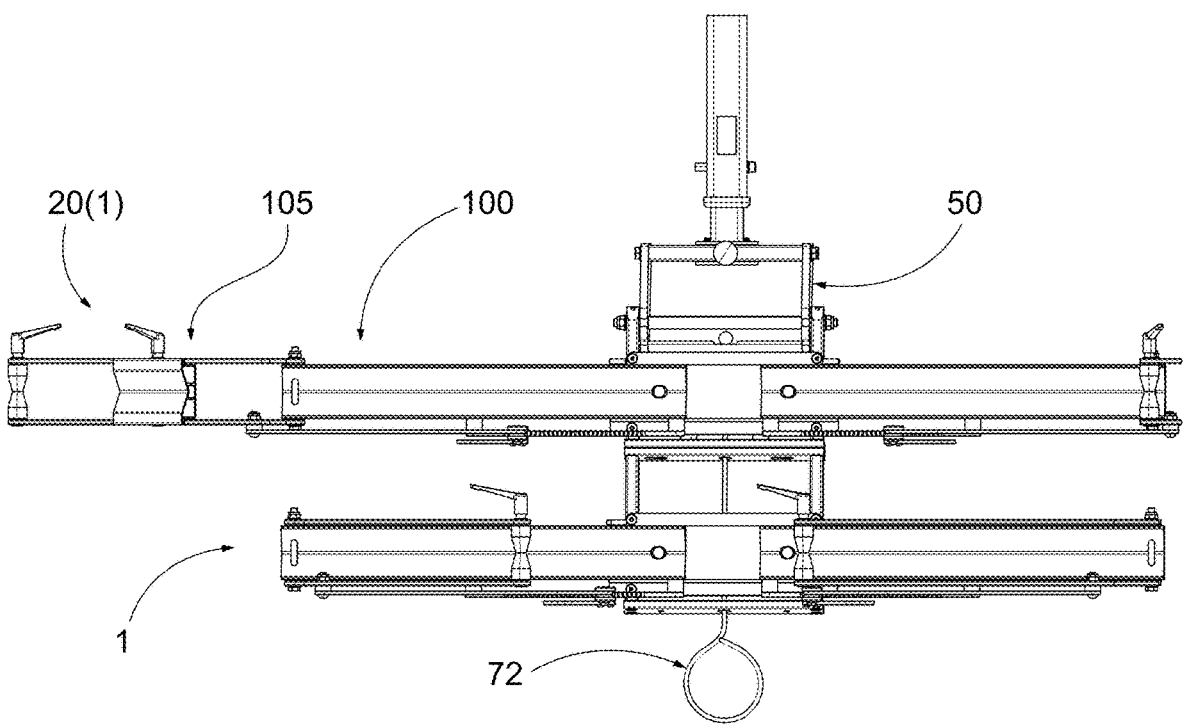

As described above a carrier 1 may be used as an add-on tray for a carrier so that two bikes nay be carried. Additional carriers 1 may allow additional bikes to be carried. FIGS. 9A and 9B respectively show a top perspective view and a top view of a carrier 1 attached to a carrier 100 to provide a carrier configured to carry two bikes behind a motor vehicle. One wheel retention arm 20(1) is shown rotated below horizontal to support ramp insert 105 to allow a bike to be rolled onto carrier 100. One can appreciate that other wheel retention arms also are capable of being rotated similarly to provide for rolling a bike onto carrier 1 also.

Although the ramp insert 105 is shown as being releasably attached to the wheel retention arms 20 via a through bolt with a quick release lever, other embodiments may be envisioned. In other embodiments, the ramp insert is configured to remain on the wheel retention arms in a selfstowage configuration. For example, the ramp may be hinged on one of the side arms and can rotate into the space between the two side arms. In another embodiment, the ramp may be configured to nest below the wheel tray and slide out and down onto the side arms when in the ramp position.

FIGS. 10-13 illustrate a bike carrier 1000 according to another exemplary embodiment of the invention. Bike carrier 1000 is substantially the same as bike carrier 100, with the substantial differences noted herein. A frame 110 supports a bike carrying tray assembly comprising first and second wheel trays 115a and 115b. A bike is mounted on the carrier 1000 by placing its wheels in respective wheel trays 115a, 115b with central channels to accommodate the bottoms of the bike wheels. Any rigid structural material may be used for the wheel trays, preferably extruded aluminum. These trays may be extrusions such as a U-channel or V-channel that are concave upward to retain the wheels and lock the steering of the bike. The trays 115a, 115b are shown in co-aligned laterally extended position to receive the wheels of a bike. Desirably, the carrier comprises a separate tray 115a, 115b for each wheel, enabling the trays to be folded together in a parallel configuration for compact shipping and storage (see FIG. 4).

A wheel retention arm 120a, 120b is respectively attached pivotally 116a, 116b near each end of the trays 115a, 115b. In the embodiment illustrated, the retention arms 120a/120b are illustrated in a stowed position, and each comprise two parallel side arms 121a, 121b and 122a, 122b and a cross member 123a, 123b between them that contacts a tire of the respective wheel of the bike (not shown). The cross member of each wheel retention arm is releasably mounted between the parallel side arms at a selectable position by a releasable mechanism along a length of the parallel side arms that allows the cross member to adjust for different diameters of bike wheels. In the embodiment shown, each wheel retention arm has a plurality of holes 124a, 124b to adjust the position of the cross members 123a, 123b for different wheel diameters. The releasable mechanism may comprise an internal threaded shaft that passes through the cross member and opposed holes in the parallel side arms to engage a nut placed on the outside of one of the side arms. Levers 125a, 125b comprise an integral wrench to rotate the threaded shaft. They may be spring-loaded so that they may be selectively engaged to the threaded shaft for loosening or tightening when desired but not engage the shaft to minimize accidental rotation of the threaded shaft.

Bike carrier 1000 is further configured for mounting to a tubular trailer hitch receiver on a motor vehicle, comprising a drawbar assembly 50 attached to the bike carrying tray assembly. Carrier 1000 may be considered as a main bike carrier assembly when used in conjunction with an add-on tray as described herein.

Figure 14A:
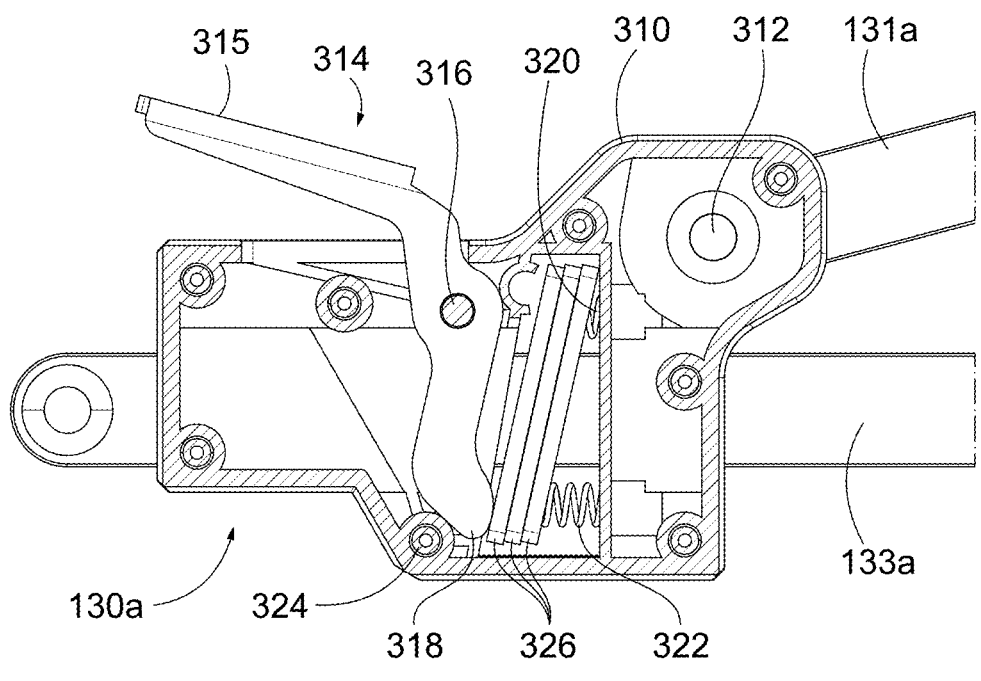
FIG. 14A is a side view of the clamp mechanism in a locked configuration.

In embodiments, the wheel retention arms 120a/120b are configured to pivot through a reflex angle from a horizontal closed position over the wheel trays through an intermediate wheel engagement position to a below-horizontal position that provides a frame to support a ramp insert that allows a bike to roll onto the wheel trays. (See FIG. 1A, which shows retention arm 20a pivoted inward and shows retention arm 20b in a wheel engagement position for bike carrier 1. FIG. 1B shows retention arm 20b for bike carrier 1 in a ramp position to allow a bike to roll onto the bike carrier for easy loading.) Each retention arm 120a, 120b pivots inward until the cross member 123a, 123b contacts the tire of the nearest wheel of the bike. The arm is locked against this tire by a clamp mechanism 130a/130b acting through a stay 131a, 131b connected between the bar 133a/133b and the retention side arm 121a, 21b (FIG. 14A). This causes the tires to be bracketed between the arms, securing the bike in all directions by its tires. Stays 131a, 131b comprise a reverse curve or S-curve to allow the wheel retention arms to rotate through a reflex angle, shown in FIG. 1B for bike carrier 1 by the double-headed arrow.

The pivotal position of each wheel retention arm 120a/120b is controlled by a pivot lock, e.g., clamp mechanism 130a/130b. The clamp mechanism 130a/130b prevents outward pivoting of the wheel retention arms 120a/120b unless intentionally released by the user. FIGS. 14A-B and 15A-B illustrate are cross-sectional views of an embodiment of a clamp mechanism 130a/130b that holds the wheel retention arm 120a/120b tight against a tire. The wheel retention arm 120a/120b is held against the tire by a stay 131a/131b between pivot point 117a/117b on side arm 121a/121b of retention arm 120a/120b (see FIG. 1B) and the pivot point 312 of the clamp mechanism 130a/130b. FIGS. 14A-15A illustrate clamp mechanism 130a, although it is understood that clamp mechanisms 130a/130b operate mechanically in the same manner. Clamp mechanism 130a is shown in an engaged configuration in FIG. 14A, in which body 310 is fixed with respect to bar 133a. Clamp mechanism 130a is shown in a disengaged configuration in FIG. 15A, in which body 310 is freed to slide along bar 133a.

Figure 14B:
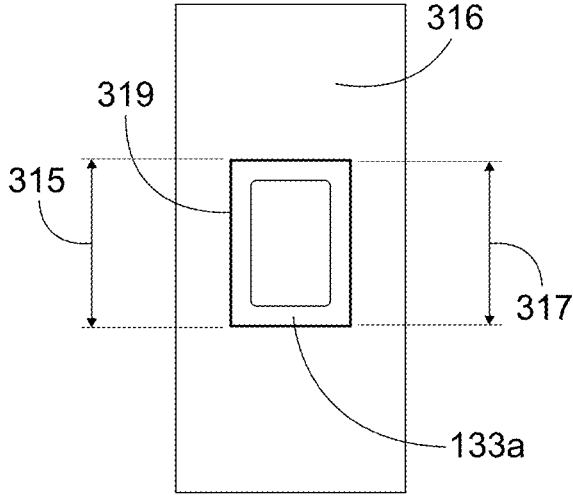
FIG. 14B is a cross-sectional view of components of the clamp mechanism in the locked configuration.
Figure 15A:
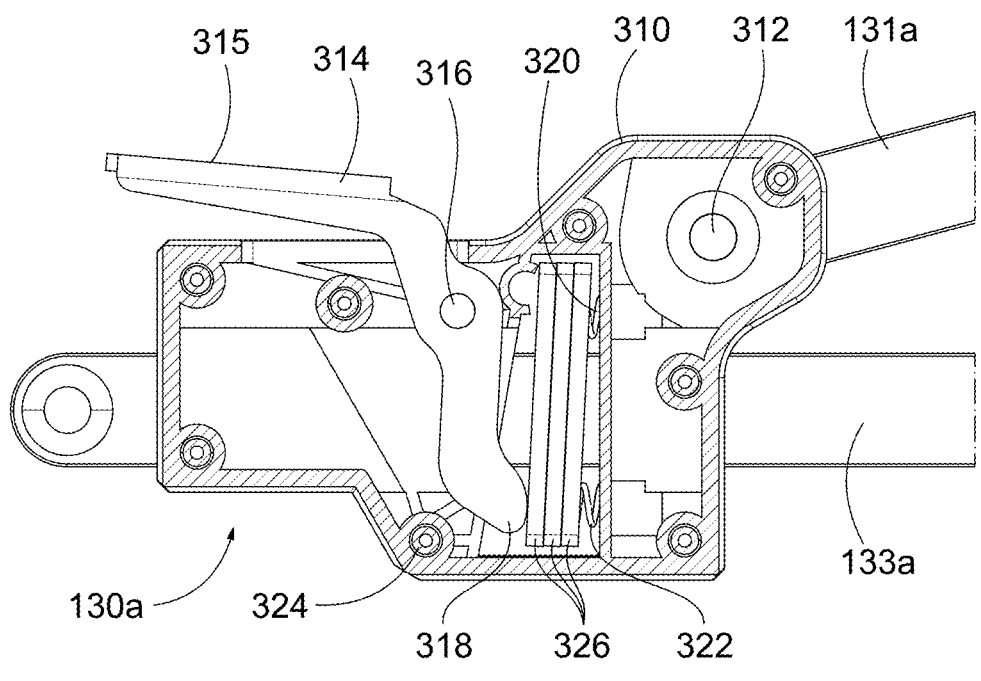
FIG. 15A is a side view of the clamp mechanism in an unlocked configuration.
Figure 15B:
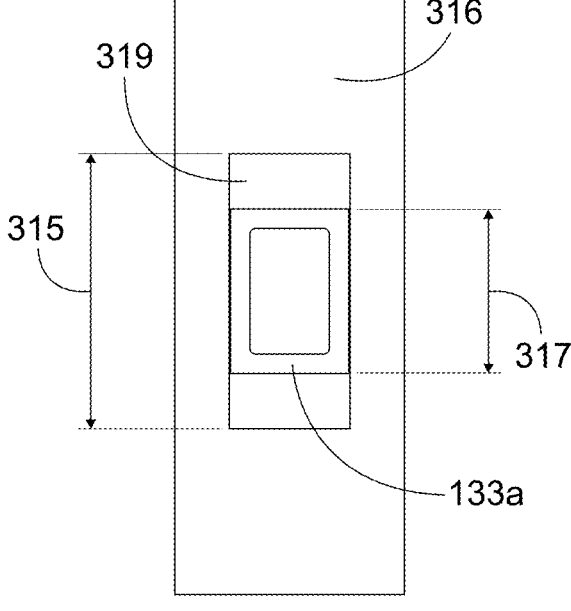
FIG. 15B is a cross-sectional view of components of the clamp mechanism in the unlocked configuration.

Clamp mechanism includes a plurality of engagement plates 326 having a center aperture 319 sized to slide over bar 133a, and aperture 319 having a height 315 that is greater than the height 317 of the bar 133a (See FIG. 14A). In the exemplary embodiment, three engagement plates 326 are shown although it is understood that fewer or more plates could be used in the clamp mechanism 130a. The stay 131a is pivotally connected to body 310 at pivot point 312. A lever 314 is pivotally coupled to body 310 at fulcrum 316 and includes a user end 315 and a contact end 318. In the engaged configuration of FIG. 14A, the engagement plates 326 are deflected by springs 322/320 in an inclined position. Moreover, spring 322 urges the contact end 318 of the lever 314 against the limit 324. When in the inclined position, the apertures 319 of the engagement plates 326 have a smaller effective height dimension 315, and are in tight conformance with the bar 133a, thereby immobilizing the body 310 with respect to bar 133a. See FIG. 14B illustrating the effective height 315 is reduced such that the aperture 319 is in contact with the bar 133a. In the disengaged configuration of FIG. 15A, the user depresses the user end 315 of lever 314 downward (arrow D) against the biases of springs 320/322. The contact end 318 moves about fulcrum 316 (arrow E) deflects the bottom portion of engagement plates 326 against spring 322 into an upright position. When in the upright position, the apertures 319 of the engagement plates 326 have a greater effective height dimension 315, providing clearance with the height 317 of the bar 133a, thereby allowing the body 310 to slide with respect to bar 133a (See FIG. 15B).

Figure 10:
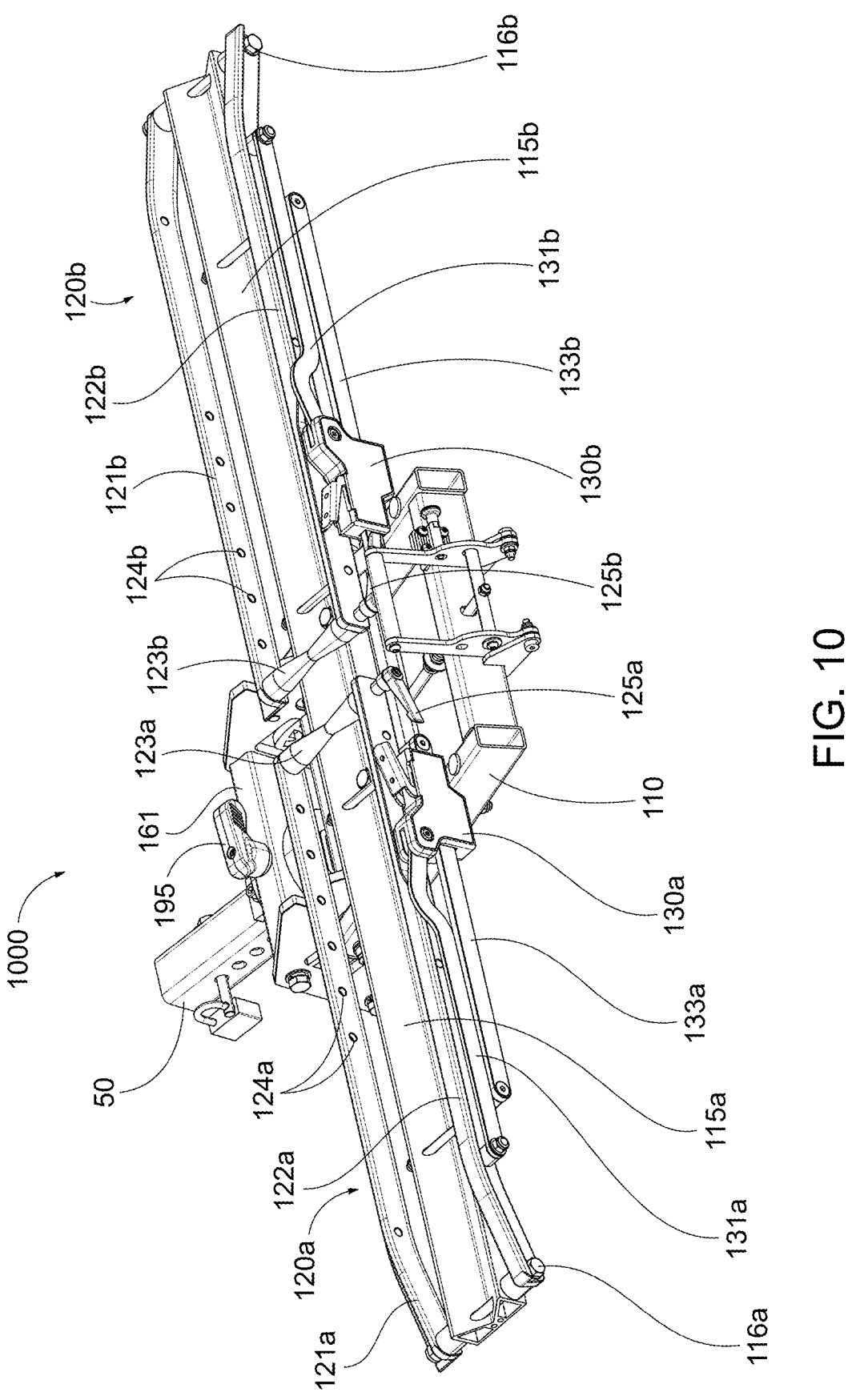
FIG. 10 is a front perspective view of a rack according to another embodiment of the disclosed subject matter.
Figure 16:
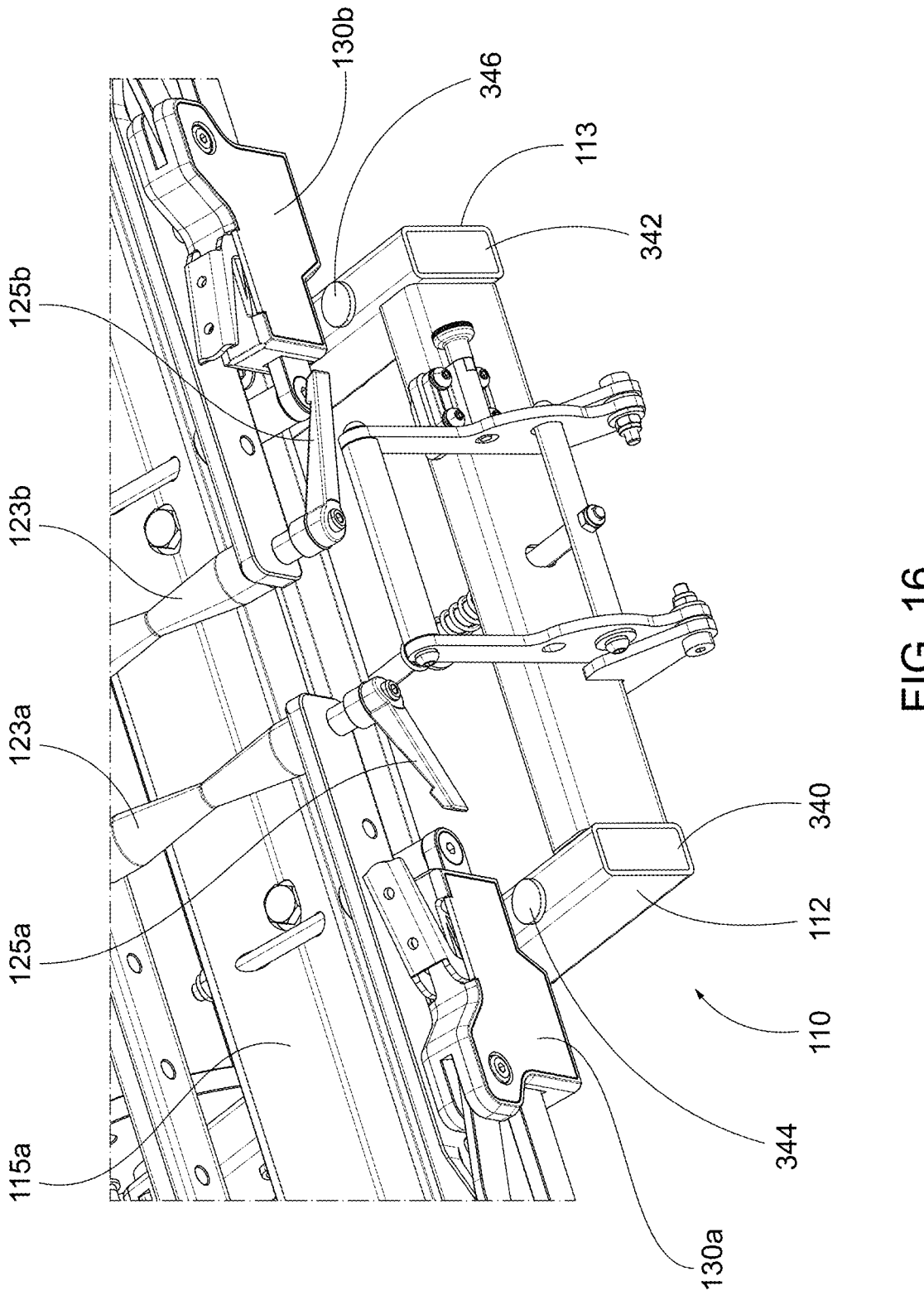
FIG. 16 is an enlarged view of FIG. 10.

FIG. 16 shows a close-up view of the frame 110 of carrier 1000 as shown in FIG. 10. Frame 110 includes side bars 112 and 113 having a rectangular cross-section seized to receive the frame of an add-on tray to carry a second bike when carrier 1000 is used as a main bike carrier attached to a motor vehicle using drawbar assembly 50 as described below. Cover plates 340/342 are illustrated in FIG. 16 to cover the open end of bars 112/113 when the add-on tray is not in use. A pair of apertures is provided in each of bars 112 and 113 to allow a bolt to secure the add-on tray to the frame 110. Cover plates 344/346 are illustrated in FIG. 16 to cover the bolt apertures when the add-on tray is not in use.

Figure 11:
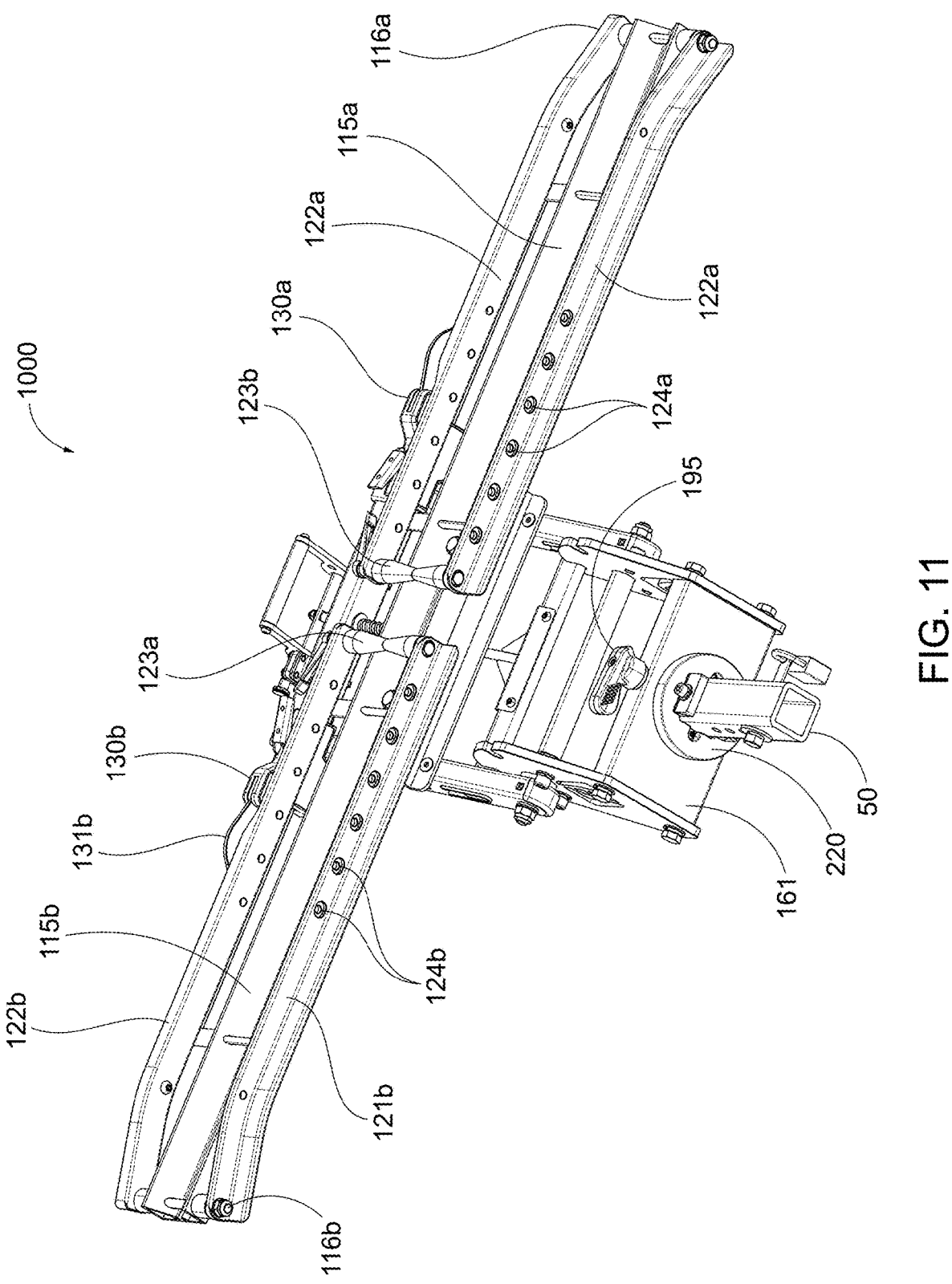
FIG. 11 is a rear perspective view of a rack of FIG. 10.
Figure 12:
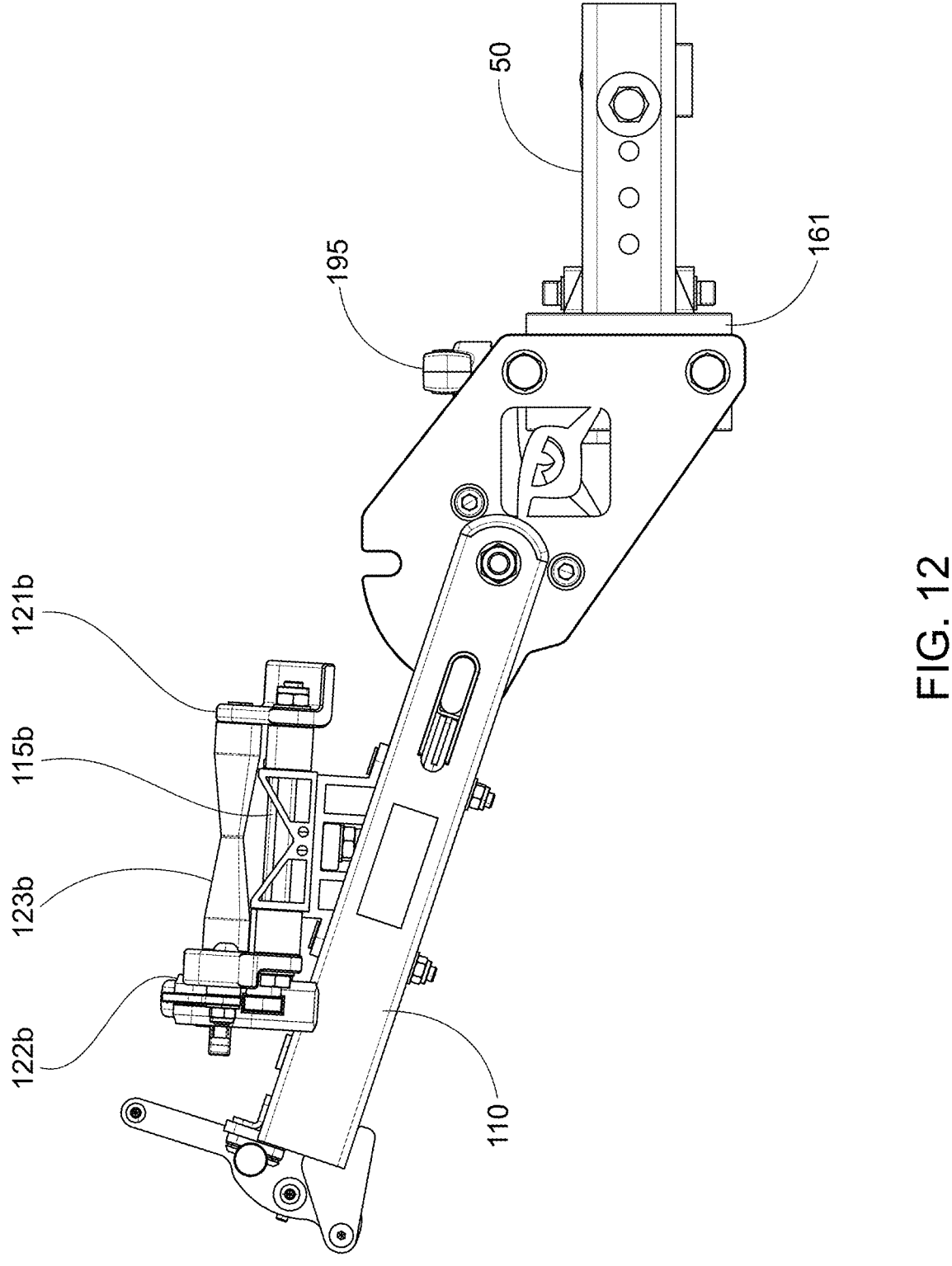
FIG. 12 is a side view of a rack of FIG. 10.
Figure 13:
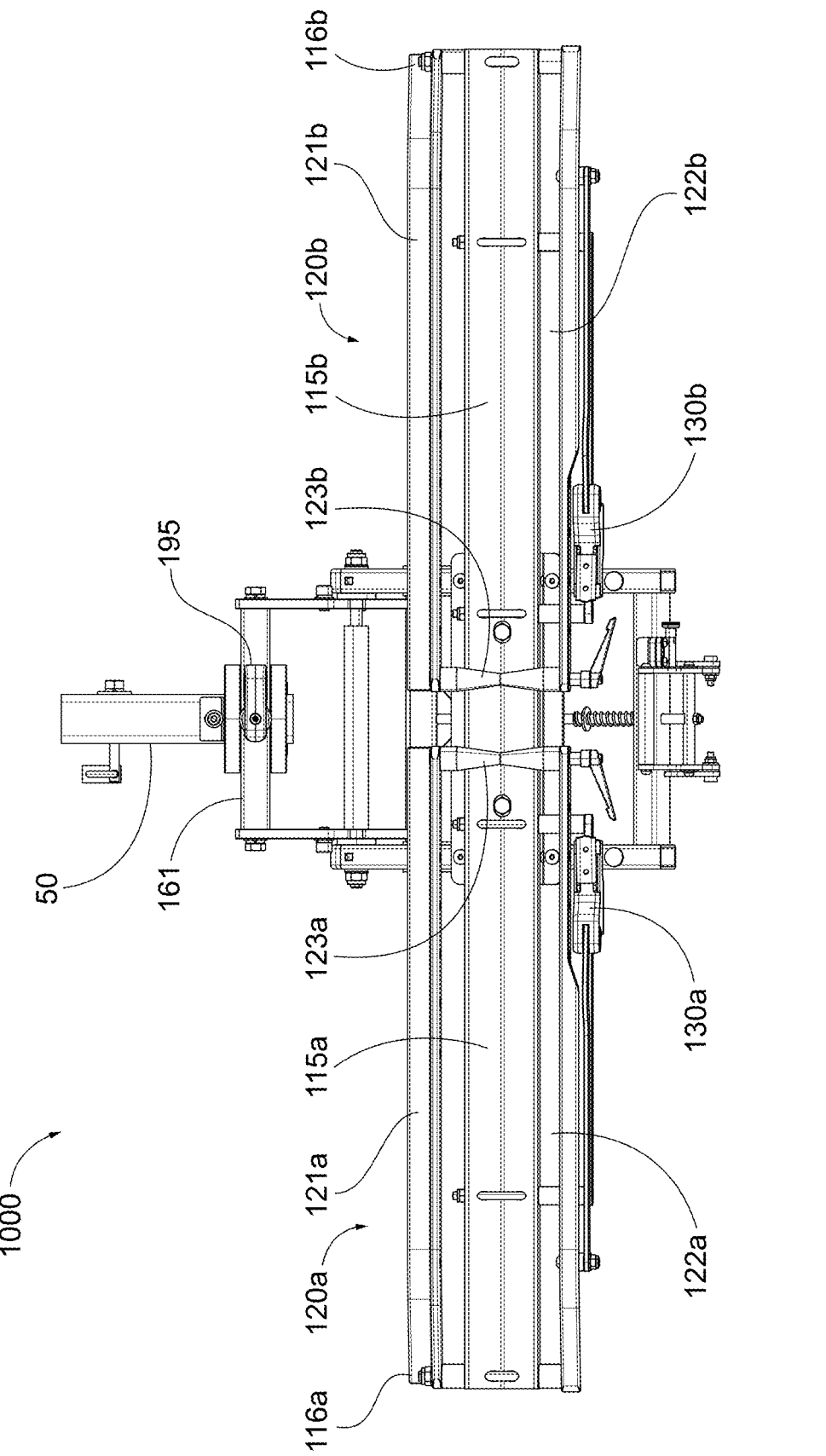
FIG. 13 is a top view of a rack of FIG. 10.
Figure 17:
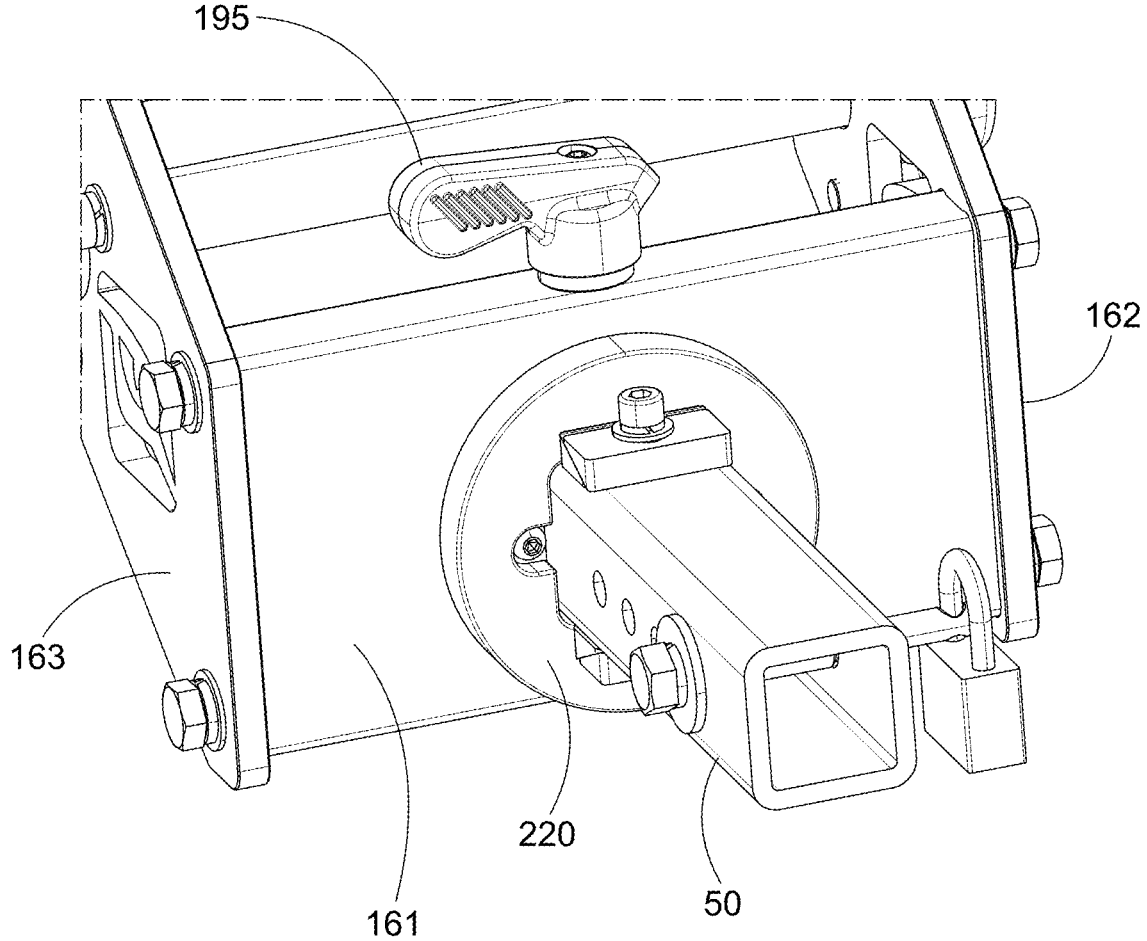
FIG. 17 is an enlarged view of FIG. 11.
Figure 18:
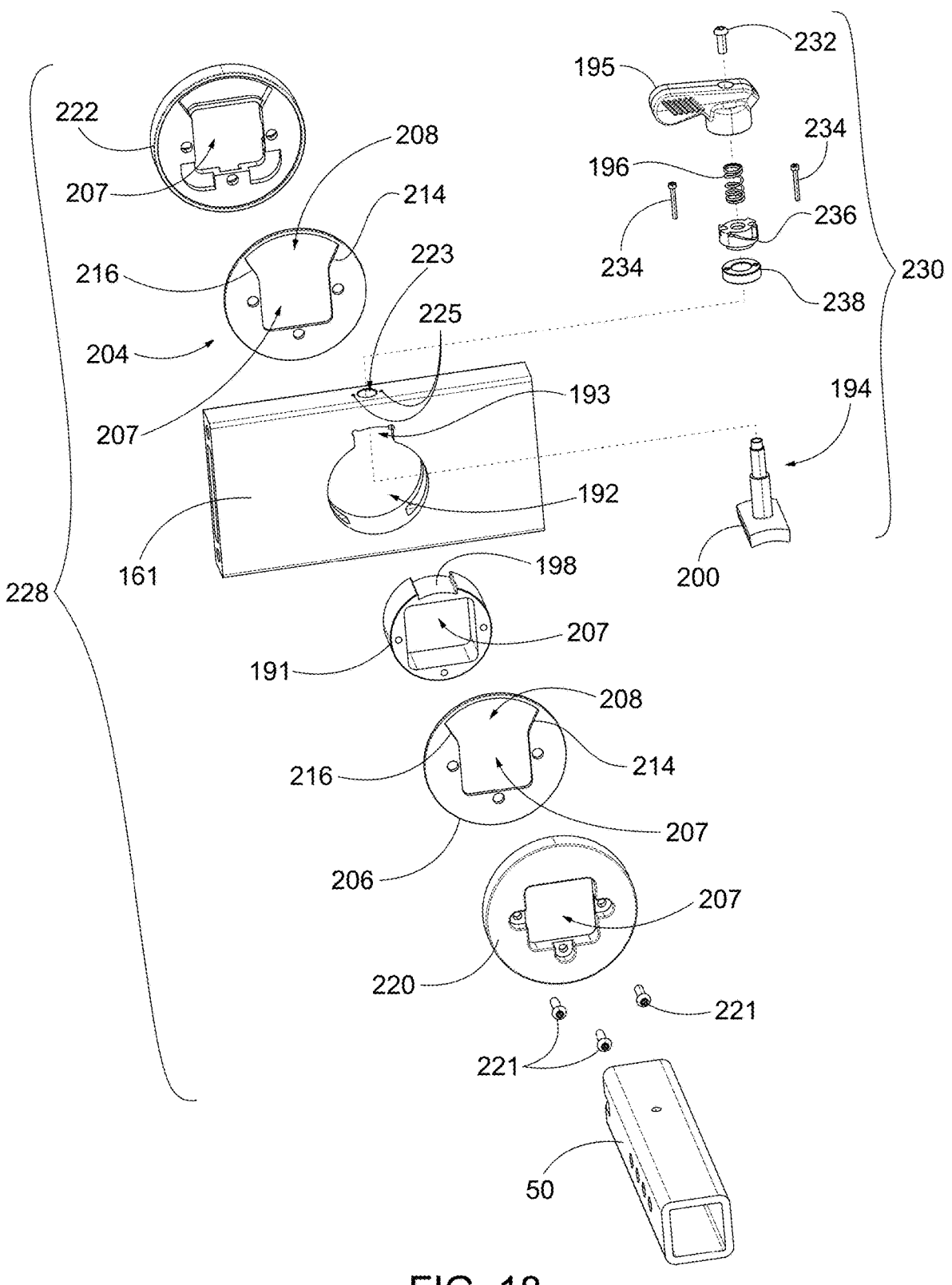
FIG. 18 is a perspective view with parts separated of the pivot mechanism of the rack of FIG. 10.
Figure 19:
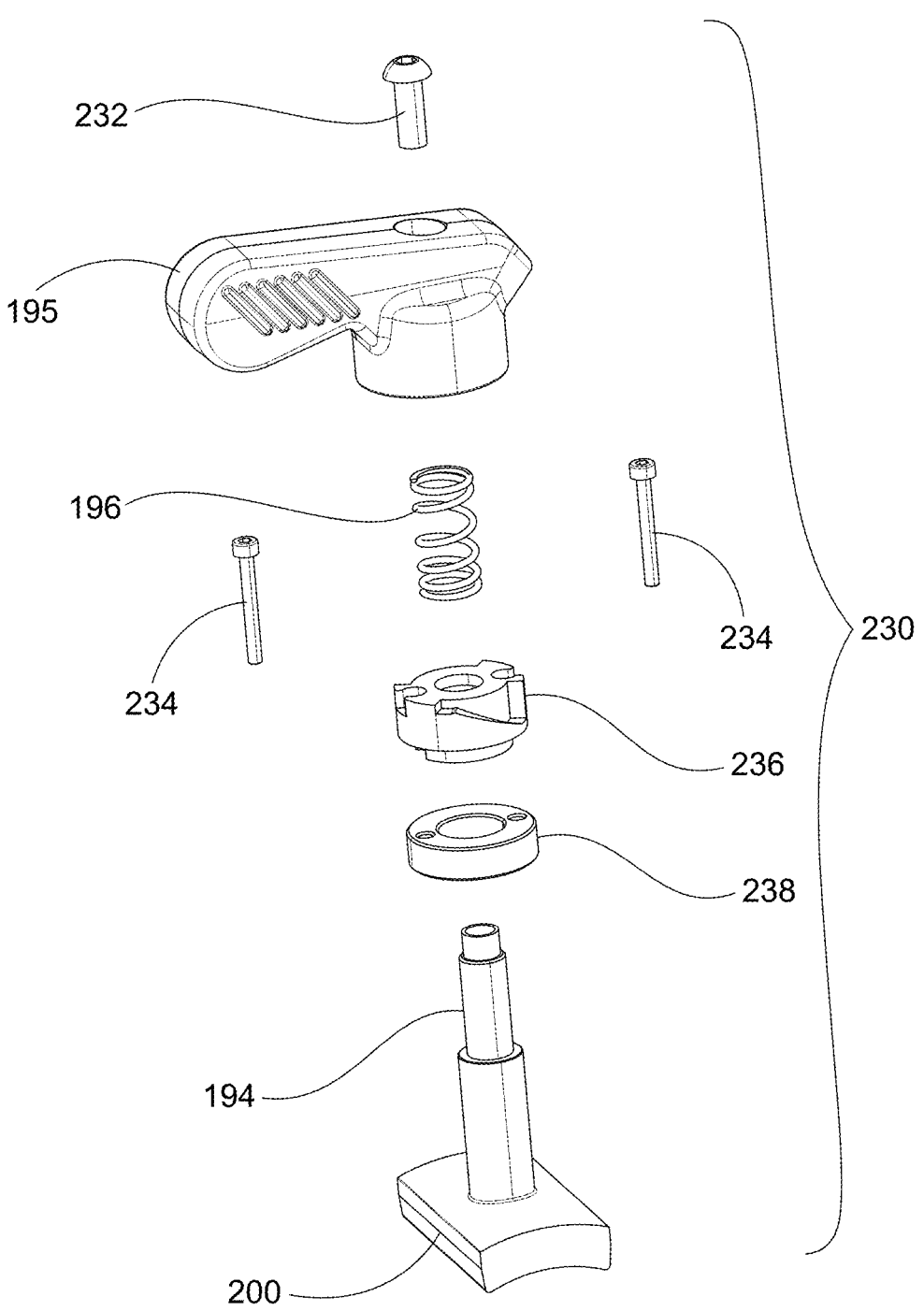
FIG. 19 is an enlarged view of components of FIG. 18.

FIG. 17 shows a close-up view of the carrier 1000 as shown in FIG. 11. FIGS. 18-19 illustrate a rotational pivot assembly coupled to the drawbar 50 to pivot the bike carrying trays 115a/115b assembly among a horizontal position, a first downward position and a second downward position. In these embodiments, the entire tray assembly can tilt to a first downward position so that one end of the carrier is proximate to the ground level, allowing one to roll a bike directly onto the carrier. Once the bike is locked onto the carrier by positioning the wheel retention arms in contact with the bike tires, the rack can be pivoted back to the horizontal position to transport the bike. The bike can be unloaded from the carrier by tilting the carrier to either the first downward position or the second downward position, disengaging the wheel retention arm on the downwardly positioned end of the carrier from the respective tire and rolling the bike off the carrier onto the ground.

FIGS. 18-19 illustrate the rotational pivot assembly 160, including the draw bar assembly 228 and release pin assembly 230. Draw bar assembly 228 is configured to receive the draw bar 50 therein and is therefore non-rotating. Pivot front plate 161, coupled to frame 110 by plates 162/163, defines a positioning hole 192 that is sized and configured to allow rotation of the pivot front plate 161 (and the bike wheel tray 115a/115b) with respect to pivot ring 191 of the draw bar assembly 228. Release pin assembly 230 includes a handle 195 that is coupled to pivot front plate 161 and rotatable therewith. Release pin assembly 230 allows pivot assembly 160 to move between a locked position, in which pivot front plate 161 (and bike carrying trays 115a/115b) is locked against rotational movement with respect to draw bar assembly 228 and an unlocked configuration, in which pivot front plate 161 (and bike carrying trays 115a/115b) is rotatable with respect to draw bar assembly 228, within predefined limits, as will be described below.

Figure 20:
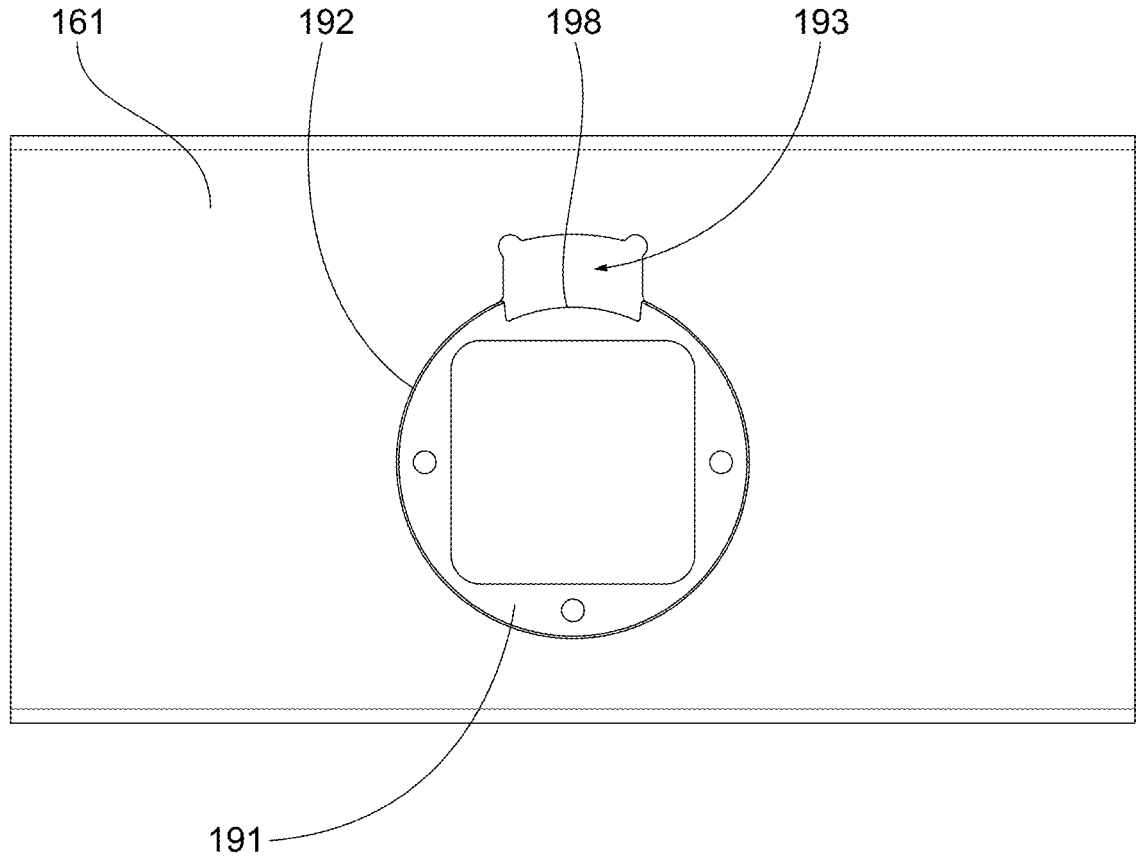
FIG. 20 is an enlarged view of portions of the pivot mechanism.

Draw bar assembly 228 includes outer plate 220, limit plate 206, pivot ring 191, limit plate 204 and outer plate 222. Each of components 220, 206, 191, 204 and 222 include an aperture 207 for receiving draw bar 50 and are preferably coupled together by bolts 221. As discussed above, pivot front plate 161 defines a positioning hole 192 and a first keyhole recess 193 extending outwardly from positioning hole 192. As in FIG. 20, pivot ring 191 is rotatable within positioning hole 192 of plate 161, and includes a second keyhole recess 198 that is capable of alignment with keyhole recess 193 when the trays 115a/115b are in the horizontal position.

Figure 21:
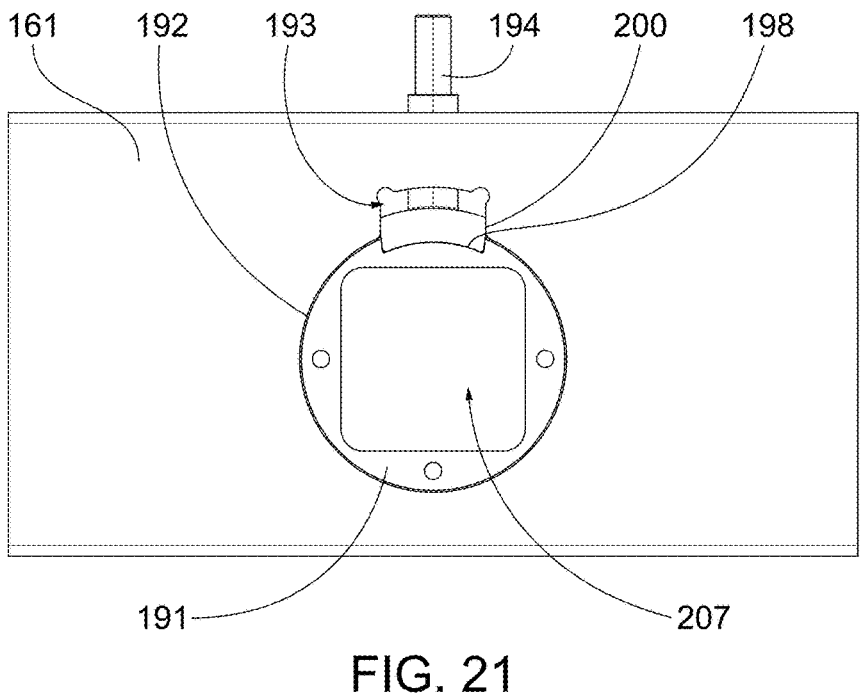
FIG. 21 is a view of the pivot mechanism in the locked configuration.
Figure 22:
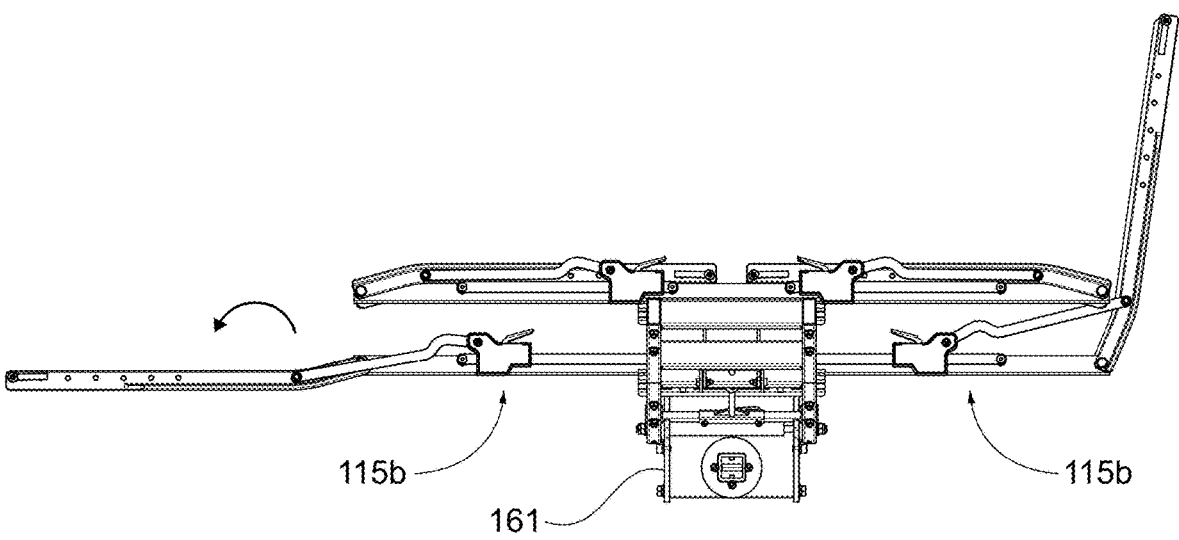
FIG. 22 is a view of the rack of FIG. 10 in the locked configuration.

As illustrated in FIGS. 18-19, release pin assembly 230 includes handle 195, pin 232, helical spring 196, securement pins 234, bushing 236, washer 238, and a release pin 194 having a concave engagement portion 200. Securement pins 234 are affixed to plate 161 in bores 225. Release pin 194 is movably received in central bore 223 in plate 161. The handle 195 is rotatable to move the pivot assembly 160 between a locked configuration and an unlocked configuration. FIG. 21 illustrates the locked configuration, in which recess 198 and keyhole portion 193 are rotationally aligned, and the concave engagement portion 200 of the adjustment pin 194 is biased by spring 196 into engagement with both the recess 198 of pivot ring 191 and the keyhole recess 193 of plat 161. Consequently, the pivot front plate 161 (and the bike wheel trays 115a/115b) are locked in a horizontal position against rotation, as shown in FIG. 22.

Figure 23:
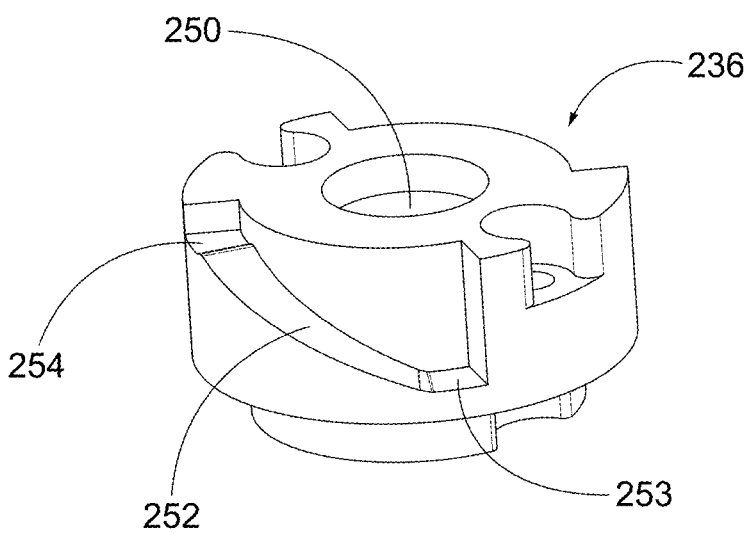
FIG. 23 is an enlarged side perspective view of a component of the pivot mechanism.
Figure 24:
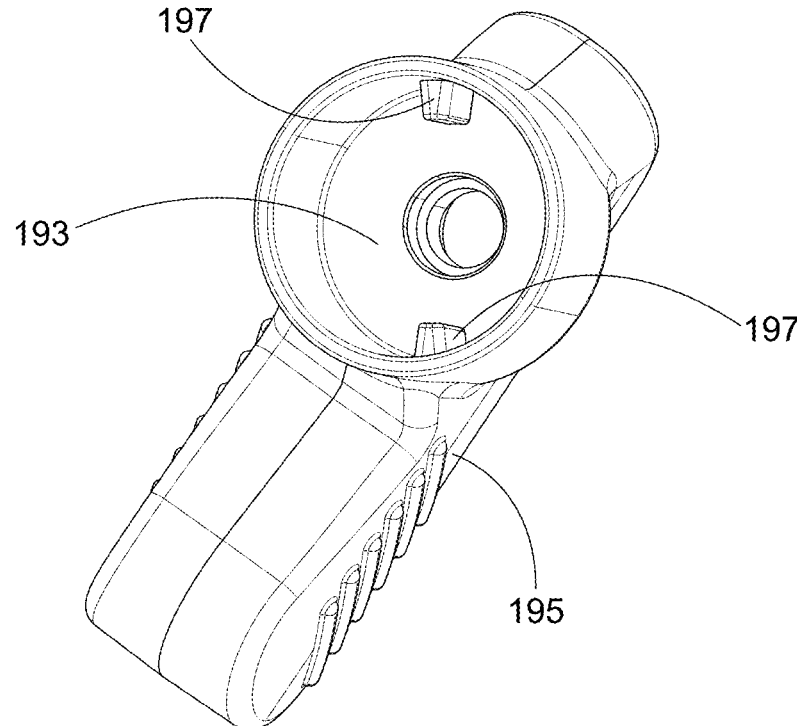
FIG. 24 is an enlarged perspective view from below of a component of the pivot mechanism.
Figure 25:
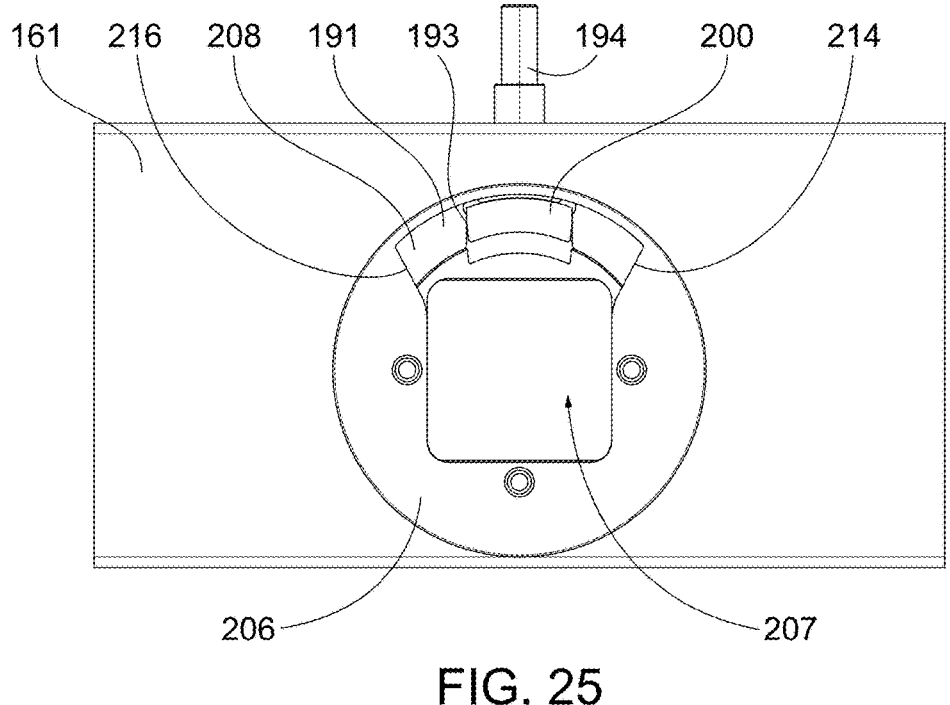
FIG. 25 is a view of the pivot mechanism in the unlocked configuration.
Figure 26:
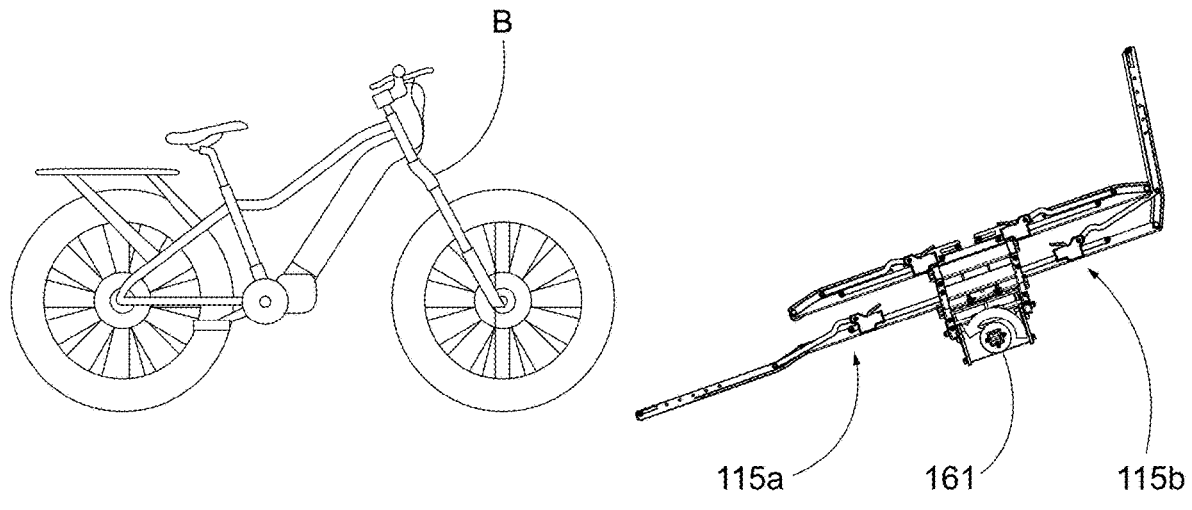
FIG. 26 is a view of the rack of FIG. 10 in the unlocked configuration and tilted position for a bike to roll onto.

To unlock the assembly, the handle 195 is rotated. As illustrated in FIG. 23, the bushing 236 includes a bore 250 to receive pin 232 and a ramped cam surface 252 having a lower flat (dwell) portion 253 and an upper flat (dwell) portion 254. As illustrated in FIG. 24, the interior of the handle 195, viewed from below, includes a recess 193 and a ridge 197 that engages the ramped cam surface 252 on bushing 236. In the locked position, ridge 197 of handle 195 rests in the lower flat (dwell) portion 253 of ramped cam surface 252. Rotating the handle 195 moves ridge 197 upward along ramped cam surface 252 to drive the adjustment pin 194 upward (away from pivot ring 191) against the bias of spring 196, thereby moving the concave engagement portion 200 out of engagement with the recess 198 and moving portion 200 further upward into the keyhole recess 193, as illustrated in FIG. 25. The cam surfaces 252 of the bushing 236 include a flat (dwell) portion 254 that retains the portion 200 out of engagement with recess 198 and allows free rotation of front plate 161 with respect to pivot ring 191. Rotating of front plate 161 allows the tilting of the first bike wheel tray 115a to allow loading of bicycle B, as shown in FIG. 26. Coupled to the pivot ring 191 are plates 204 and 206, each of which defines an opening 207 for receiving the draw bar 51 and a limiting recess 208 extending from the opening 207. Each recess 208 defines a first limiting edge 214 and a second limiting edge 216. As the pivot front plate 161 rotates downward into the first downward position, the concave engagement portion 200 engages the first limiting edge 214, thus preventing further rotation in the first direction. As the pivot front plate 161 rotates downward into the second downward position, the concave engagement portion 200 engages the second limiting edge 216, preventing further rotation in the second direction.

Figure 27:
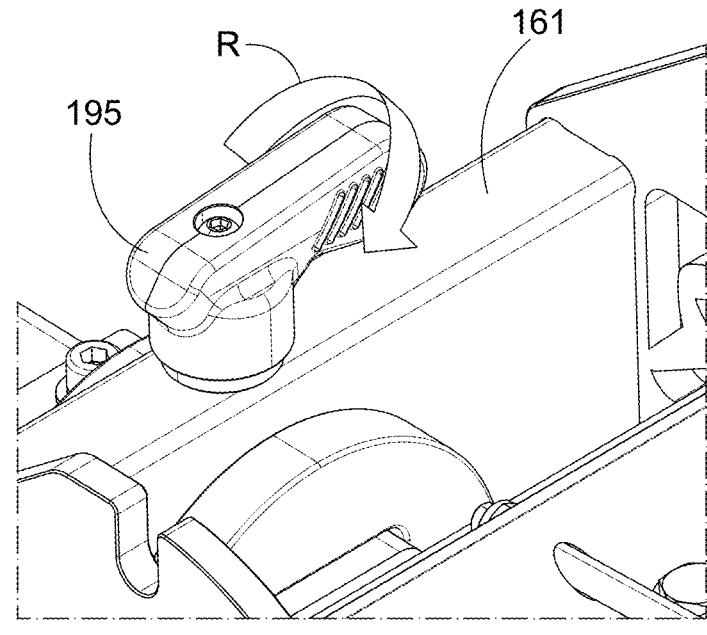
FIG. 27 is view of the release handle in the locked configuration.
Figure 28:
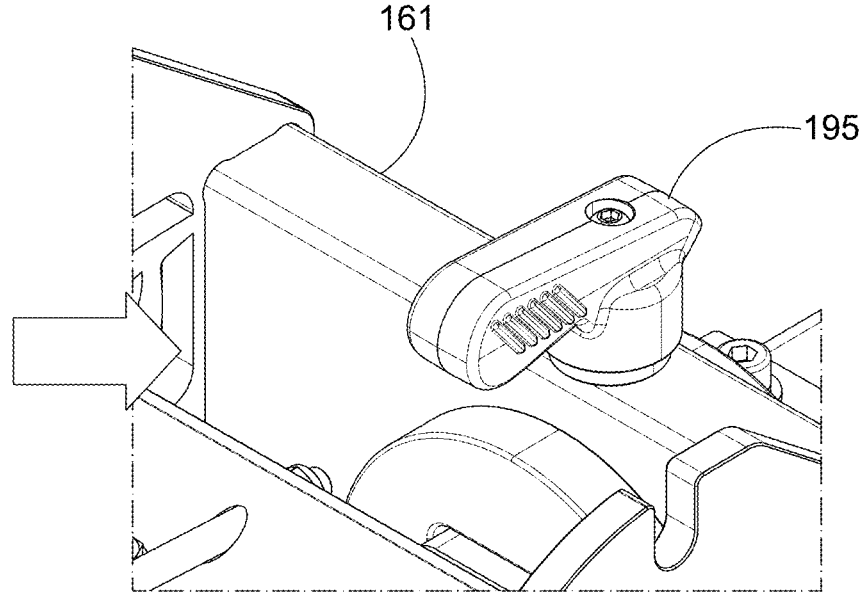
FIG. 28 is view of the release handle in the unlocked configuration.

Handle 195 is generally rotatable approximately 90 degrees. In the stowed position, as shown in FIG. 27, the handle 195 is substantially aligned with the plate 161, and the pivot assembly is in the locked configuration. When the handle 195 is rotated as indicated by arrow R, the cam surfaces of the bushing 236 cooperates with the ridge 197 of the handle 195 to drive the concave engagement portion 200 out of engagement with the pivot ring. When the handle 195 is rotated approximately 90 degrees as shown in FIG. 28, the ridge 197 of handle 195 is positioned in the flat (dwell) portion 254 of the bushing 236 to retain the plate 161 in the unlocked position, capable of rotation with respect to the pivot ring 191. The bias of spring 196 assists in returning the concave engagement portion 200 into the locked configuration and pivoting the handle 195 back to the stowed position of FIG. 27.

In embodiments of the bike carrier comprising the pivot ring 191, the carrier may pivot from a horizontal position (0° tilt) to a first downward position with a tilt range of −20° to −35°, such as −30°, where a first end of the carrier is tilted downward. The second downward position tilts the opposite or second end of the bike carrier downward. One can appreciate that this tilts the first end of the carrier upward with a tilt range of +20° to +35°, such as +30°. The tilt range is determined by the placement of the first and second limiting edges 214/216. In either tilted orientation, the tilt provides that either the first or second end of the bike carrier is proximate the ground so a bike can be rolled onto the carrier.

Figure 29:
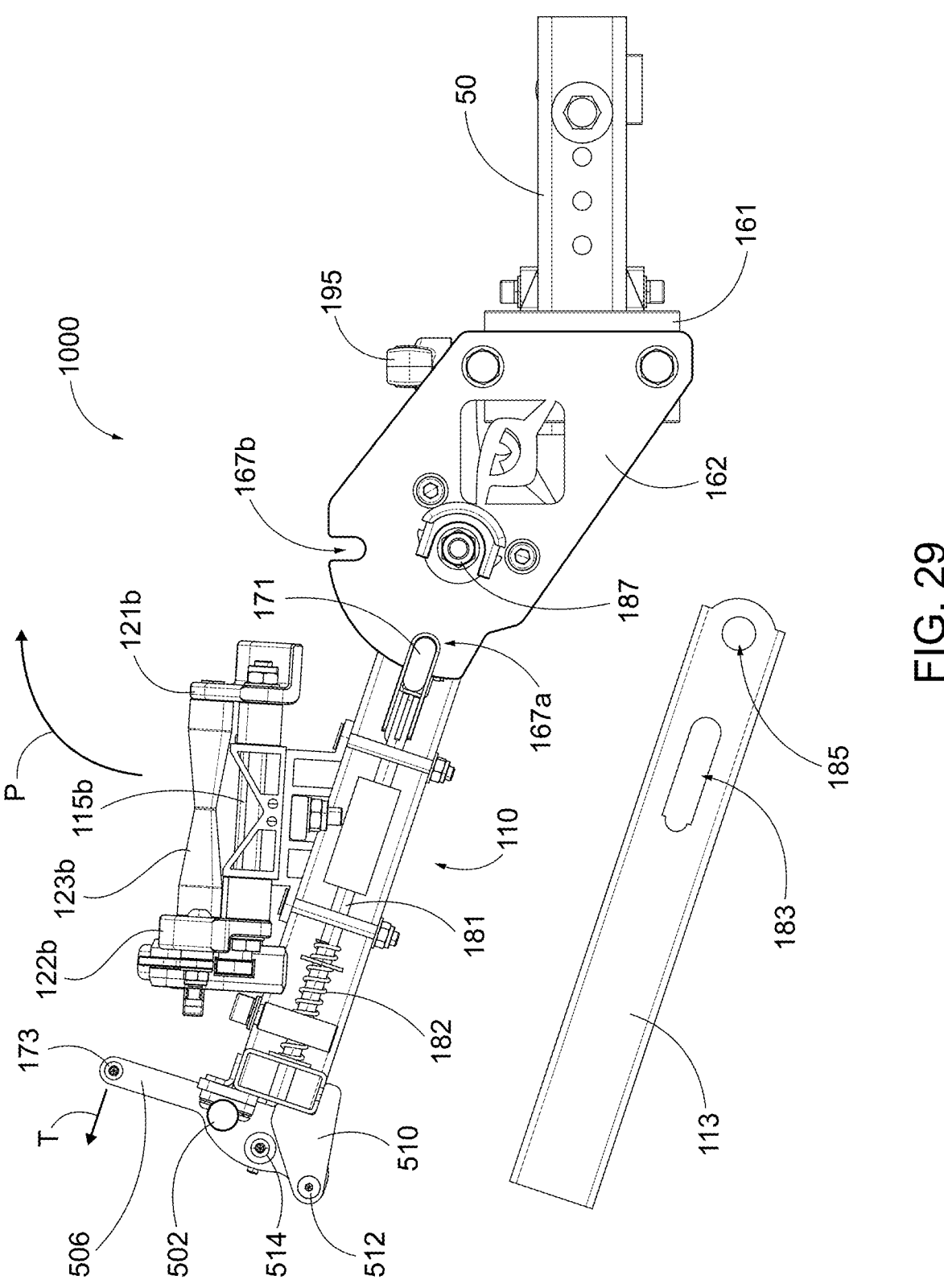
FIG. 29 is a side view similar to FIG. 12 with parts separated.

FIG. 29 is a side view of the drawbar assembly 50, pivot assembly 160, and main tray frame assembly 110, with a number of parts removed to allow for simpler depiction. Notably, side plate 113 is removed to show how the pivot lock bar 171 and spring support member 181 are aligned relative to the side plate 162/163. Pivot lock bar 171 is slidably mounted on the main tray frame 110 and falls into a selected one of detents 167*a*/167*b* under force of a spring 182. As shown in FIG. 29, plate 113 includes a slot 183 to guide pivot lock bar 171 and an aperture 185 for pivot 187. In the illustration, pivot lock bar 171 is engaged in detent 167*a*, disposing the tray assembly 115*a/b* substantially horizontally. As shown the tray assembly 115*a/b* is canted upward about 5 to 10 degrees from true horizontal. Release bar 181 extends from the lock bar 171 to trigger handle 173 at the back of the main tray assembly 110. Pulling the trigger handle 173 in direction of arow T, via a linkage mechanism, releases the pivot lock bar 171 from the slot 167*a*, allowing the tray assembly to be rotated about pivot 187 (arrow P). When pivot lock bar 171 is engaged to the slot 167*b*, the tray assembly is disposed substantially vertical. It is understood that plates 162/163 (not shown in FIG. 29) may include additional intermediate detents to stow the tray assembly in additional positions.

Figure 30:
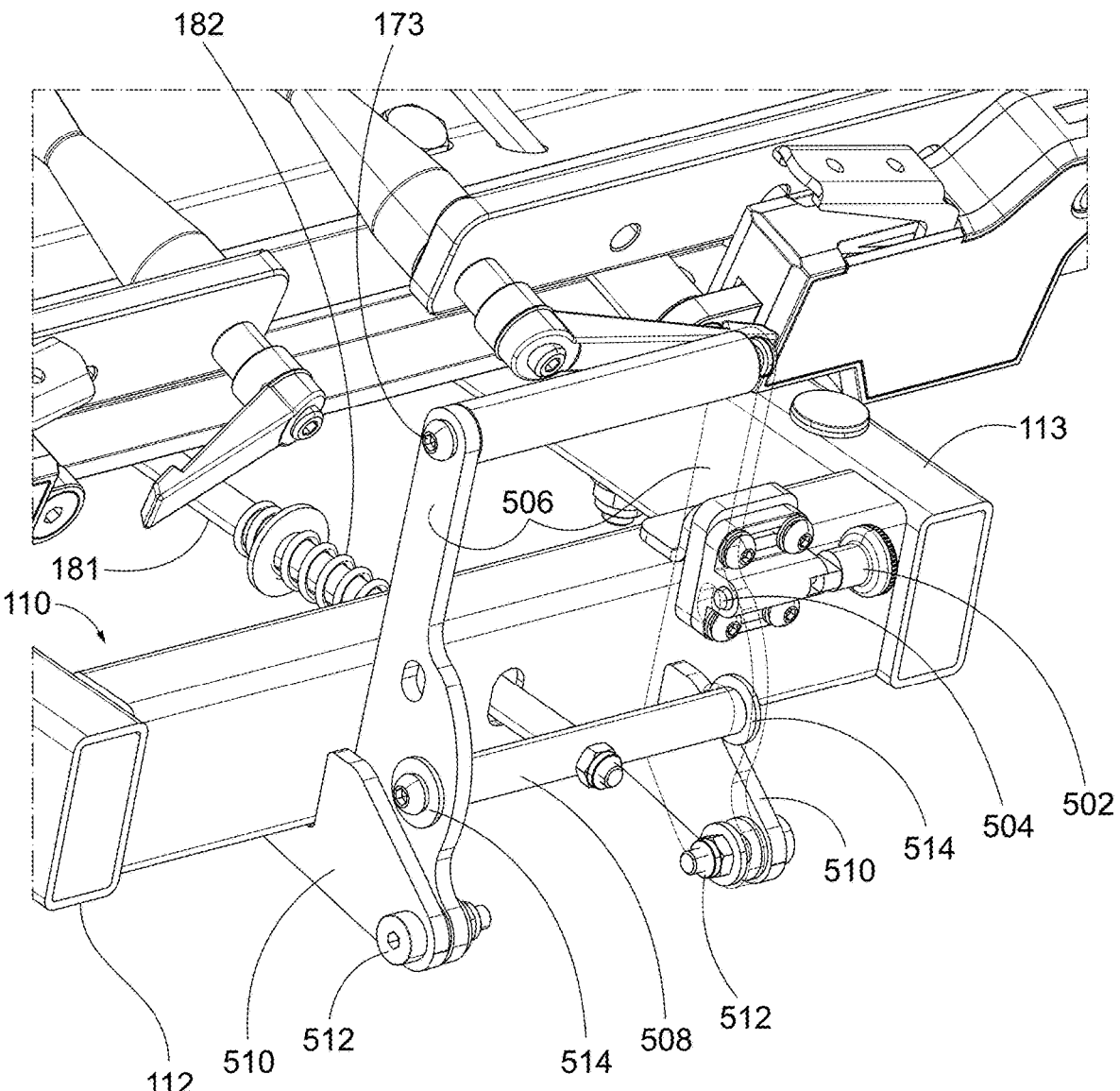
FIG. 30 is an enlarged view of FIG. 10.

FIG. 30 illustrates the linkage assembly in greater detail. Trigger release handle 173 include side plates 506 pivotally mounted to frame 110 via mounting plates 510 about pivot points 512. Trigger release handle further include a bar 508 rotatably mounted to side plates 506 at respective pivot points 514 located a distance from pivot points 512. The end of release bar 181 is coupled to bar 508. Thus, when trigger release bar 173 is moved in the direction of arrow T of FIG. 29, side plates 506 pivot about points 512, thereby moving release bar 181 in the direction of arrow T, and removing pivot lock bar 171 from the detents 167*a/b* to allow pivoting of the frame 110 and tray assembly 11*a/b*.

In order to secure the tray assembly 115*a/b* in a locked position with respect to detents 167*a/b*, a safety pin 502 is provided. Pin 502 is spring biased into engagement with aperture 504 in side plate 506, thus locking the trigger release handle from movement. Pin 502 is moved by the user out of engagement with aperture 504 to allow actuation of handle 173.

The rack may be used in any orientation. For example, it may be mounted vertically on a showroom wall, holding a bicycle vertically. A wide, sturdy implementation of the rack may be used to carry a motorcycle.

While the disclosed subject matter is described herein in terms of certain non-limiting exemplary embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments. In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of non-limiting example embodiments of the disclosed subject matter has been presented for purposes of illustration and description. It is not intended to be exhaustive or to limit the disclosed subject matter to those embodiments disclosed herein.

What is claimed is:

1. A bike carrier comprising:
a bike carrying tray assembly comprising first and second wheel trays for holding respective first and second wheels of a bike;
a wheel retention arm pivotally attached to a distal end of each of the trays that contacts a tire of the respective wheel of the bike; and
a retention arm pivot lock acting on a stay between each wheel retention arm and the tray to which it is attached, wherein the pivot lock is configured to selectively allow the wheel retention arm to pivot to
provide inward pivoting of the wheel retention arm to lock the retention arm with a cross member pressed against the tire of the respective wheel,
provide outward pivoting of the wheel retention arm to release the bike from the carrier, and
provide further outward pivoting to allow the bike to roll onto the first or second wheel trays;
a drawbar assembly attached to the bike carrying tray assembly, the drawbar assembly comprising a drawbar configured for engagement to a tubular trailer hitch receiver; and a centrally disposed rotational pivot assembly coupled to the drawbar and the bike carrying tray assembly configured to pivot the bike carrying tray assembly among a horizontal position, a first downward position and a second downward position to allow the bike to roll onto the bike carrying tray assembly in either the first downward position or the second downward position;
a vertically oriented pivot plate attached to the bike carrying tray assembly, the pivot plate including a positioning hole defining a first keyhole recess; and
the drawbar assembly comprises a pivot ring rotatable in the positioning hole, the pivot ring further defining a second keyhole recess alignable with the first keyhole recess;
a retention pin assembly comprising a handle rotatably coupled to the vertically oriented pivot plate; and a spring-loaded retention pin movable by the handle and comprising an engagement member configured to move between a first position in which the engagement member is disposed in the first and second keyhole recess to inhibit rotation of the pivot ring with respect to the pivot plate and a second position in which the engagement member is disposed within the first keyhole recess to permit rotation of the pivot ring with respect to the pivot plate.

2. The bike carrier of claim 1, wherein the pivot lock comprises a clamp mechanism.

3. The bike carrier of claim 1 wherein each wheel retention arm comprises two parallel side arms and the cross member of each wheel retention arm is mounted between the parallel side arms at a selectable position along a length of the parallel side arms that allows the cross member to adjust for different diameters of bike wheels.

4. The bike carrier of claim 3 wherein the cross member of each wheel retention arm is mounted between the parallel side arms in respective opposed slots or opposed holes of a plurality of holes by a releasable mechanism.

5. The bike carrier of claim 1, wherein the first and second wheel trays are each pivotally mounted to the bike carrying tray assembly for pivoting of said trays between a co-aligned laterally extending operational position and a parallel position.

6. The bike carrier of claim 1, wherein a back end of the bike carrying tray assembly is configured to engage an add-on bike carrying tray assembly.

7. The bike carrier of claim 6, wherein the back end of the bike carrying tray assembly comprises holes to bolt the add-on bike carrying tray assembly to the bike carrying tray assembly.

8. The bike carrier of claim 1, wherein the drawbar assembly further comprises a limit plate defining a pair of limit surfaces; such that the relative rotation of the pivot plate and the engagement member is inhibited when the engagement member contacts each of the pair of limit surfaces.

9. The bike carrier of claim 1, wherein the spring-loaded retention spring is biased into the first position.

10. The bike carrier of claim 1, wherein retention pin assembly further comprises a member defining a cam surface, such that rotation of the handle urges the retention pin and the engagement member between the first position and the second position.

11. The bike carrier of claim 10, such that the cam surface defines a dwell portion to maintain the engagement member in the second position.

12. A bike carrier configured for mounting to a tubular trailer hitch receiver on a motor vehicle comprising:

a bike carrying tray assembly comprising first and second wheel trays for holding respective first and second wheels of a bike;

a wheel retention arm pivotally attached to a distal end of each of the first and second trays, that contacts a tire of the respective wheel of the bike; and a retention arm pivot lock acting on a stay between each wheel retention arm and the tray to which it is attached, wherein the pivot lock is configured to allow the wheel retention arm to pivot to provide inward pivoting of the wheel retention arm to lock the retention arm with the cross member pressed against the tire of the respective wheel and provide outward pivoting of the wheel retention arm to release the bike from the carrier; and a drawbar assembly attached to the bike carrying tray assembly, the drawbar assembly comprising a drawbar configured for engagement to a tubular trailer hitch receiver; and a centrally disposed rotational pivot assembly coupled to the drawbar and the bike carrying tray assembly configured to pivot the bike carrying tray assembly among a horizontal position, a first downward position and a second downward position to allow the bike to roll onto the bike carrying tray assembly in either the first downward position or the second downward position; wherein the rotational pivot assembly comprises a vertically oriented pivot plate attached to the bike carrying tray assembly, the pivot plate including a positioning hole defining a first keyhole recess;

the drawbar assembly further comprising a pivot ring rotatable in the positioning hole, the pivot ring further defining a second keyhole recess alignable with the first keyhole recess; and a retention pin assembly comprising a handle rotatably coupled to the vertically oriented pivot plate; and a spring-loaded retention pin movable by the handle and comprising an engagement member configured to move between a first position in which the engagement member is disposed in the first and second keyhole recess to inhibit rotation of the pivot ring with respect to the pivot plate and a second position in which the engagement member is disposed within the first keyhole recess to permit rotation of the pivot ring with respect to the pivot plate.

13. The bike carrier of claim 12, wherein a back end of the bike carrying tray assembly is configured to engage an add-on bike carrying tray assembly.

14. The bike carrier of claim 12 wherein the back end of the bike carrying tray assembly comprises holes to bolt the add-on bike carrying tray assembly to the bike carrying tray assembly.

15. The bike carrier of claim 14 further comprising:

a horizontal crossbar attached to a back end of the drawbar;

left and right vertically oriented pivot plates attached to respective left and right ends of the crossbar, each pivot plate comprising a plurality of pivot lock slots providing a plurality of pairs of opposed pivot lock slots on the pivot plates;

wherein the bike carrying tray assembly is pivotally mounted onto the pivot plates;

a pivot lock bar on the main bike carrying tray assembly that slides into a selected pair of the pivot lock slots under a spring force; and a trigger operationally connected to the pivot lock bar at a back end of the bike carrying tray assembly;

wherein operating the trigger slides the pivot lock bar out of a selected pair of pivot lock slots, enabling the carrying tray assembly to be pivoted upward into a compact position behind the motor vehicle, and downward into a deployed position for carrying a bike, wherein the compact and deployed positions are each lockable by the pivot lock bar disposed in a respective pair of the pivot lock slots.

16. The bike carrier of claim 15 wherein the trigger is operationally connected to the pivot lock bar via a linkage assembly mounted in the bike carrying tray assembly and attached to the pivot lock bar.

* * * * *